(12) United States Patent
Sundaram et al.

(10) Patent No.: US 12,417,434 B2
(45) Date of Patent: Sep. 16, 2025

(54) JAILED ENVIRONMENT RESTRICTING PROGRAMMATIC ACCESS TO MULTI-TENANT DATA

(71) Applicant: Capital One Services, LLC, McLean, VA (US)

(72) Inventors: Dinesh Sundaram, Plano, TX (US); Raman Bajaj, Frisco, CA (US); Jacques Morel, Colleyville, TX (US); Sanjiv Yajnik, Dallas, TX (US); Trent Jones, Mckinney, TX (US); Alan Ilango, Mckinney, TX (US); Jacob Creech, Mckinney, TX (US); Avijit Sarkar, Mckinney, TX (US); Rajaboopathy Vijayaraghavan, Carrollton, TX (US); Ishu Gupta, Mckinney, TX (US); Thomas Sickert, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/595,786

(22) Filed: Mar. 5, 2024

(65) Prior Publication Data
US 2024/0202364 A1 Jun. 20, 2024

Related U.S. Application Data

(63) Continuation of application No. 16/882,163, filed on May 22, 2020, now Pat. No. 11,935,003.
(Continued)

(51) Int. Cl.
*G06Q 40/03* (2023.01)
*G06F 9/445* (2018.01)
(Continued)

(52) U.S. Cl.
CPC ......... *G06Q 10/10* (2013.01); *G06F 9/44505* (2013.01); *G06F 9/54* (2013.01);
(Continued)

(58) Field of Classification Search
None
See application file for complete search history.

(56) References Cited

U.S. PATENT DOCUMENTS 7,461,080 B1 12/2008 Tucker
7,565,313 B2 7/2009 Waelbroeck et al.
(Continued)

FOREIGN PATENT DOCUMENTS

WO 2015136503 A1 9/2015

*Primary Examiner* — Divesh Patel
(74) *Attorney, Agent, or Firm* — Sterne, Kesler, Goldstein & Fox P.L.L.C.

(57) ABSTRACT

The system and methods described herein allow users to give their applicant information to at least one entity when seeking to submit an inquiry associated with an item, and have various lender microservices run in parallel, segregated by entity, in a jailed environment. The result of these microservices may be returned as a response to the inquiry, being determined autonomously for each respective entity based on one or more respective rule sets or executable logic for each respective entity. Payloads for multiple entities may be combined in a single output from the jailed environment due to outputs from the environment being encrypted in a universal format.

20 Claims, 10 Drawing Sheets

Related U.S. Application Data

(60) Provisional application No. 62/852,202, filed on May 23, 2019.

(51) Int. Cl.

| | | |
|---|---|---|
| *G06F 9/54* | (2006.01) | |
| *G06F 16/25* | (2019.01) | |
| *G06F 16/955* | (2019.01) | |
| *G06F 18/24* | (2023.01) | |
| *G06F 21/53* | (2013.01) | |
| *G06F 21/60* | (2013.01) | |
| *G06F 21/62* | (2013.01) | |
| *G06F 40/103* | (2020.01) | |
| *G06F 40/174* | (2020.01) | |
| *G06F 40/18* | (2020.01) | |
| *G06N 3/02* | (2006.01) | |
| *G06N 5/025* | (2023.01) | |
| *G06N 20/00* | (2019.01) | |
| *G06Q 10/10* | (2023.01) | |
| *G06Q 20/38* | (2012.01) | |
| *G06Q 20/40* | (2012.01) | |
| *G06Q 30/018* | (2023.01) | |
| *G06Q 30/0201* | (2023.01) | |
| *G06Q 30/0601* | (2023.01) | |
| *G06Q 40/02* | (2023.01) | |
| *H04L 9/08* | (2006.01) | |
| *H04L 9/40* | (2022.01) | |
| *G06F 8/65* | (2018.01) | |
| *G06F 8/71* | (2018.01) | |
| *G06K 7/14* | (2006.01) | |
| *G06Q 50/26* | (2012.01) | |

(52) U.S. Cl.
CPC ............ *G06F 9/547* (2013.01); *G06F 16/258* (2019.01); *G06F 16/9558* (2019.01); *G06F 16/9562* (2019.01); *G06F 18/24* (2023.01); *G06F 21/53* (2013.01); *G06F 21/602* (2013.01); *G06F 21/604* (2013.01); *G06F 21/6227* (2013.01); *G06F 21/6245* (2013.01); *G06F 40/103* (2020.01); *G06F 40/174* (2020.01); *G06F 40/18* (2020.01); *G06N 3/02* (2013.01); *G06N 5/025* (2013.01); *G06N 20/00* (2019.01); *G06Q 20/382* (2013.01); *G06Q 20/4014* (2013.01); *G06Q 30/0185* (2013.01); *G06Q 30/0206* (2013.01); *G06Q 30/0601* (2013.01); *G06Q 30/0613* (2013.01); *G06Q 30/0619* (2013.01); *G06Q 30/0637* (2013.01); *G06Q 30/0643* (2013.01); *G06Q 40/02* (2013.01); *G06Q 40/03* (2023.01); *H04L 9/0825* (2013.01); *H04L 63/0435* (2013.01); *H04L 63/08* (2013.01); *H04L 63/0815* (2013.01); *H04L 63/102* (2013.01); *H04L 63/123* (2013.01); *H04L 63/166* (2013.01); *H04L 63/168* (2013.01); *G06F 8/65* (2013.01); *G06F 8/71* (2013.01); *G06F 2221/2107* (2013.01); *G06K 7/1417* (2013.01); *G06Q 50/265* (2013.01); *G06Q 2220/00* (2013.01); *H04L 9/0822* (2013.01)

(56) References Cited

U.S. PATENT DOCUMENTS

| | | |
|---|---|---|
| 7,620,597 B2 | 11/2009 | Eze |
| 7,630,933 B2 | 12/2009 | Peterson et al. |
| 7,908,210 B2 | 3/2011 | Huber et al. |
| 8,392,294 B2 | 3/2013 | MacInnis |
| 8,909,551 B2 | 12/2014 | Pawlusiak et al. |
| 10,033,702 B2 | 7/2018 | Ford et al. |
| 10,210,570 B2 | 2/2019 | Bennett et al. |
| 10,243,743 B1 | 3/2019 | Madisetti et al. |
| 11,132,653 B1 | 9/2021 | Bolt et al. |
| 11,210,687 B2 | 12/2021 | Kesiboyana et al. |
| 11,935,003 B2 | 3/2024 | Sundaram et al. |
| 11,948,128 B2 | 4/2024 | Kesiboyana et al. |
| 2005/0187860 A1 | 8/2005 | Peterson et al. |
| 2006/0178983 A1* | 8/2006 | Nice ............... G06Q 40/02 705/38 |
| 2007/0244808 A1 | 10/2007 | Eze |
| 2008/0071640 A1 | 3/2008 | Nguyen |
| 2010/0023448 A1 | 1/2010 | Eze |
| 2011/0112946 A1 | 5/2011 | Porter |
| 2011/0270659 A1 | 11/2011 | Crites |
| 2011/0313884 A1 | 12/2011 | Eze |
| 2012/0179753 A1 | 7/2012 | Welingkar et al. |
| 2013/0218752 A1* | 8/2013 | Pawlusiak ......... G06Q 40/03 705/38 |
| 2014/0020068 A1 | 1/2014 | Desai et al. |
| 2014/0164774 A1* | 6/2014 | Nord ............... H04L 9/0861 713/171 |
| 2014/0279399 A1 | 9/2014 | Shidler et al. |
| 2015/0025950 A1 | 1/2015 | Yu |
| 2015/0170233 A1 | 6/2015 | Lisitsa |
| 2016/0042451 A1 | 2/2016 | Raessler et al. |
| 2016/0050272 A1* | 2/2016 | Raduchel ......... H04L 63/0442 709/204 |
| 2016/0125041 A1 | 5/2016 | Smith et al. |
| 2016/0232546 A1 | 8/2016 | Ranft et al. |
| 2016/0253753 A1 | 9/2016 | Bennett et al. |
| 2016/0314487 A1 | 10/2016 | Martin et al. |
| 2016/0350850 A1 | 12/2016 | Shields et al. |
| 2018/0040064 A1 | 2/2018 | Grigg et al. |
| 2018/0041338 A1 | 2/2018 | Nighswander et al. |
| 2018/0158139 A1 | 6/2018 | Krajicek et al. |
| 2019/0087847 A1 | 3/2019 | Peasley et al. |
| 2019/0102835 A1 | 4/2019 | Bjonerud et al. |
| 2019/0102836 A1 | 4/2019 | Wales et al. |
| 2019/0114705 A1 | 4/2019 | Wong et al. |
| 2019/0130480 A1 | 5/2019 | Brewbacker et al. |
| 2019/0333142 A1* | 10/2019 | Thomas ............ G06F 16/27 |
| 2020/0043066 A1 | 2/2020 | Obaidi |
| 2020/0311808 A1* | 10/2020 | Srivastava ......... G06Q 40/03 |
| 2020/0372499 A1 | 11/2020 | Sundaram et al. |
| 2020/0372574 A1 | 11/2020 | Sundaram et al. |
| 2020/0372575 A1 | 11/2020 | Kesiboyana et al. |
| 2020/0372576 A1 | 11/2020 | Sundaram et al. |

* cited by examiner

Overview

Example for one lender
300

Security

Auditing

JAILED ENVIRONMENT RESTRICTING PROGRAMMATIC ACCESS TO MULTI-TENANT DATA

CROSS-REFERENCE TO RELATED APPLICATIONS AND INCORPORATION BY REFERENCE

This application is a continuation of U.S. application Ser. No. 16/882,163, filed May 22, 2020 entitled "Jailed Environment Restricting Programmatic Access to Multi-tenant Data," which claims the benefit of U.S. Provisional Application 62/852,202, filed May 23, 2019, entitled "Multi-Lender Platform" which is incorporated herein by reference in their entirety.

BACKGROUND

A substantial number of commodity purchases such as those of commercial products (e.g. vehicles), or real property, involve financing, which increases the total cost of the purchase, because in addition to the price of the respective commodity, the consumer is paying for the cost of credit (interest and ancillary costs). In making such a purchase, the consumer has an incentive to minimize these additional costs. Typically, consumers obtain financing for the purchase of a commodity of interest upon visiting a seller of such a commodity (e.g. for the purchase of a car vehicle, customers obtain financing upon visiting a dealer). At such a visit, sellers often run credit checks on the consumer, to check the consumer's credit in deciding to offer a loan application. If the consumer does not buy the commodity, his or her credit score may be affected. In particular, his or her credit score can drop by several points, which may remain on the consumer's credit reports for several years. Furthermore, having loan inquiries but no loan on the consumer's credit report may make it appear as if the consumer has been turned down for the loan, and can affect future loan applications.

Alternatively, in the event that the consumer does buy the commodity from a seller with financing, the consumer still faces several hurdles in optimally financing his or her purchase. There may be a lack of familiarity between the sellers and banks that pre-approve loans, resulting in higher interest rates, sub-optimal loan terms, inaccurate assessment, or redundant information being shared separately with the seller and the bank, often making for a frustrating buying experience. Further, even if the consumer is approved for a bank loan, communications are often not integrated with the processing of a third-party bank loan. In addition to the possibility of the interest rate or other loan terms not being optimal and appropriately matched to the commodity, among other factors, the consumer faces the added inconvenience of having to communicate with two separate parties to complete the purchase of the commodity.

BRIEF DESCRIPTION OF THE DRAWINGS

The accompanying drawings, which are incorporated herein and form a part of the specification, illustrate the embodiments of the present disclosure, and together with the description, further serve to explain the principles of the embodiments and enable a person skilled in the pertinent art to make and use the embodiments, individually, or as a combination thereof.

DETAILED DESCRIPTION

Provided herein are system, apparatus, device, method and/or computer program product embodiments, and/or combinations and sub-combinations thereof, for utilizing a multi-lender architecture.

The multi-lender architecture may include interactive microservices that communicate together in a bi-directional manner to create a normalized process for the purchase of a commodity, such as commercial goods/products (e.g. a vehicle, appliances, etc.), or real property. The purchase of vehicles are used as an example of a product purchase in the embodiments described herein. In such an example, the architecture may include assessing prequalification for a loan, followed by calculating pricing details for potential loans that would be offered based on a consumer's particular financial credentials, across a range of multiple vehicles, for a plurality of lenders. In existing marketplace solutions for facilitating such purchases, buyers and lenders/sellers often have to directly handle negotiations after an initial assessment. In contrast, with the multi-lender architecture of the embodiments in the present disclosure, with the presence of a vault that segregates data by lender, an end-to-end intermediating architecture is presented. Consumer-specific credentials are tailored to be submitted against custom lender-specific requirements and the result is assessed within the architecture, guiding both parties through the steps of prequalification, goods/property eligibility, goods/property pricing, and finally the linking of a resulting credit application for the purchase of said goods or property.

Figure 1:
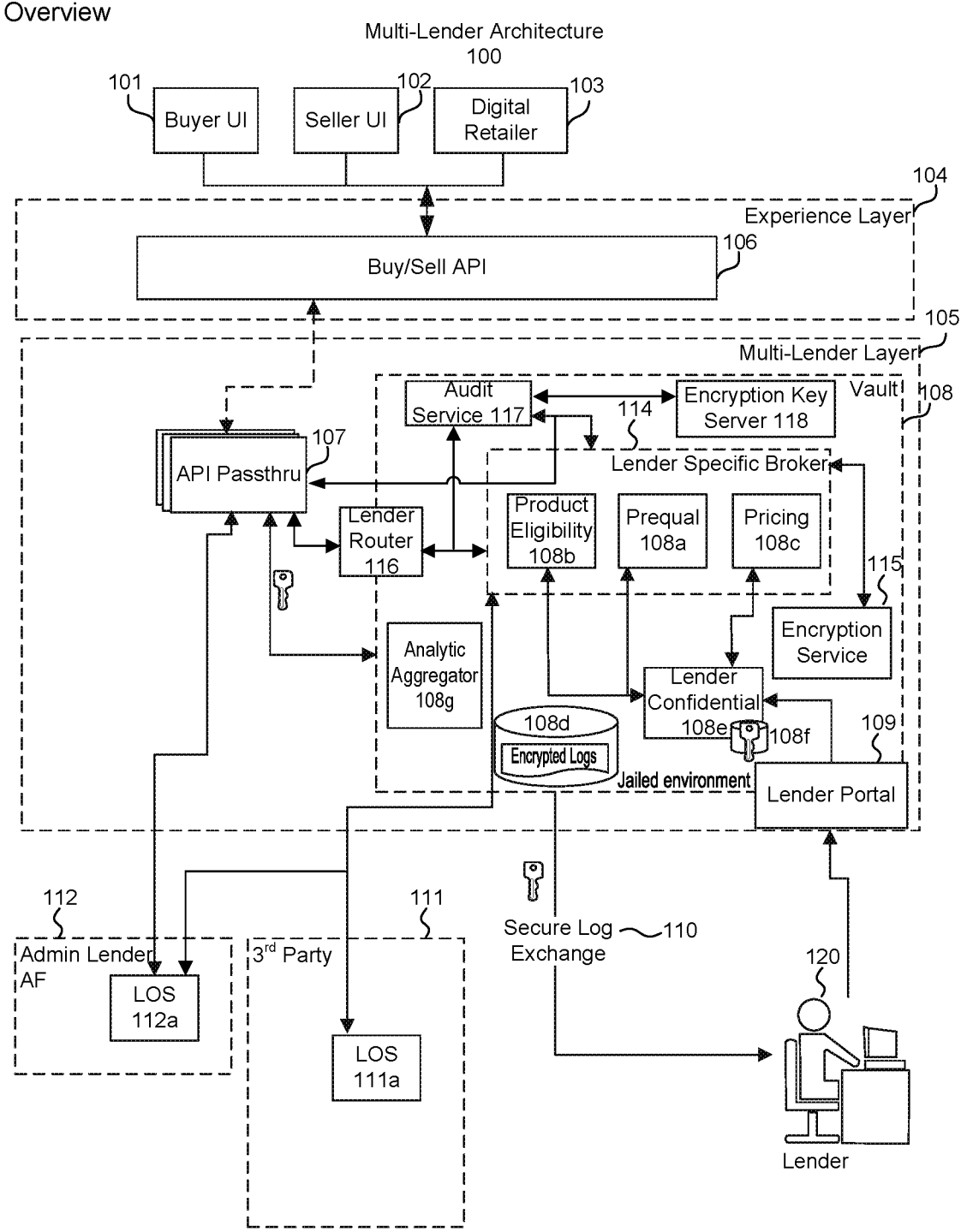
FIG. 1 is a block diagram of a multi-lender platform architecture, comprising of an Experience Layer and a Multi-lender Layer, according to a plurality of embodiments.

FIG. 1 is a block diagram illustrating the multi-lender architecture 100 according to an embodiment dealing with the example of a product purchase (e.g. a vehicle). The upper portion of the architecture, as shown in FIG. 1, includes the Experience Layer 104, which defines the portion of the architecture which the user utilizes to interface with the back-end of the architecture, and which relays information from the back-end of the architecture to the user. The back-end of the architecture comprises the Multi-Lender Layer 105. The Experience Layer 104 may be accessed by numerous user-facing interface applications, including Buyer UI 101, Seller UI 102, or Digital Retailer 103. For example, a consumer seeking to purchase a vehicle can log in from the Buyer UI 101 interface to the Experience layer, to access a plurality of prospective lenders and an inventory of vehicles displayed in a marketplace. Availability of a vehicle for each lender may vary based on relationships between each lender and associated dealerships or lender specific policies based on credit score, vehicle, geography, etc. Similarly, following the same example, a dealer may log in to the Experience Layer 104 using the Seller UI 102 interface, and a customer/seller/administrator of a digital retailer may log in to the Experience Layer 104 using the Digital Retailer 103 interface, respectively. Regardless of the interface application used, the Experience Layer is accessed through the Buy/Sell API 106. In this manner, the Experience Layer 104, through the Buy/Sell API 106, is able to display information outputted from a vault 108 in the multi-lender layer 105, to the customer, dealer, or digital retailer, through the interface application being used, in a lender agnostic format. That is, information gathered in a lender-specific manner from multiple lenders in the Multi-Lender Layer 105 may be combined in a single payload and outputted to the Experience Layer 104, from where it is displayed in any of user-facing interface applications 101-103, and may be displayed in a universal, consumer-friendly format.

The Multi-Lender Layer 105, from which lender-specific information is relayed to and from the Experience Layer 104, and onwards to the end-user, through the aforementioned interfaces, may include an API Passthru 107, and a Vault 108. In the Multi-Lender Layer 105, the Vault 108 includes various lender-specific micro-processes contained in a lender specific broker 114, such as Prequalification 108a, Product Eligibility 108b, and Pricing 108c. When a prequalification request, pricing request, or product eligibility request, etc., is submitted for multiple lenders from the experience layer, the requests go through the API passthru 107 to a lender router 116, which routes the requests to a lender specific broker 114. Each separate lender has its own lender specific broker 114, and the lender router 116 routes each respective request to the correct broker 114 for a particular lender.

Once routed to the correct lender specific broker 114, a request may assess two types of eligibility by a lender when determining if an applicant may be able to obtain a loan for a desired product, such as a vehicle. The first eligibility request determines applicant eligibility, which is assessed by the Prequalification micro-service 108a. The second type of eligibility request determines product eligibility, assessed by a separate product Eligibility micro-service 108b.

Every lender may give their own requirements with respect to applicant prequalification and for which products may be eligible for lending, as lender-specific information, where said information is stored in rules in the Lender Confidential information repository 108f. The multi-lender architecture is able to take these individual lender requirements, which each lender inputs through an individual lender portal 109, through the lender confidential data service 108e. Through this self-contained service in the vault, inaccessible to the administrators of the multi-lender architecture, the multi-lender architecture is able to autonomously take individual processing rules and logic inputted through the lender portal, and standardizes these lender-specific processing rules into rules which may be parsed by the lender specific micro-processes 108a-108c, and house them in a Lender Confidential Repository 108f, in vault 108.

The vault 108 may also include an Encrypted Logs Data Repository 108d. In the structure of the vault 108, the analytic aggregator 108g may run as a background service which collects and parses encrypted logs and generates business metrics autonomously for every component running inside the vault (e.g. microservices 108a-108c, etc.). The collected logs and generated metrics give the ability to create dashboards for the administrator of the multi-lender architecture. For example, the generated metrics can indicate the health of the vault 108 and its functioning (e.g. troubleshooting for bandwidth problems, connection problems, host problems, infrastructure problems, as well as individual microservice bottlenecking or capacity problems, etc.) without revealing any sensitive information for individual lenders. The encrypted logs are segregated by lender, wherein a particular lender may be able to access the results of their particular logs through an individual lender-specific key in the secure log exchange 110, which may be a server utilizing modes of authentication such as FTP, FTP/SSL, SFTP, FTPS, or the like. In this manner, although microservice and individual component metrics are tabulated in a non-lender specific manner, individual lender-specific information, including potentially sensitive information, trade secrets, etc., can still be kept secure through the use of the lender-specific keys.

Metrics assessed from the Encrypted Logs Data Repository 108d can include host and infrastructure metrics, as well as microservice metrics for every component in the vault. Host and infrastructure metrics may include assessing overall volume of data on a server, volume requests for individual lender-specific brokers on a particular server, etc. Microservice metrics for assessing a microservice may include, e.g., volume of applications being processed in a predetermined period of time, CPU utilization by the microservice, RAM utilized by the microservice, service availability, the microservice's number of database connections to any databases it uses, latency, errors and exceptions (both handled and unhandled), and the health and status of dependencies, etc.

There may also be an Audit Service 117, where requests or responses sent from one component to another in the vault, as will be explained infra, are written to an audit repository 502, shown in FIG. 5, as well as to the Encrypted Logs Data Repository 108d for lender-specific components such as microservices 108a-108c. Audit encryption keys to encrypt such events on a lender-specific basis before they are written into the audit repository 502 or Encrypted Logs Data Repository 108d may be retrieved from Encryption Key Server 118. The Encrypted Logs Data Repository 108d associated with the vault may comprise the details of the lender-specific rules that were executed by microservices, what data looked like as it went through these microservices in the vault, etc., to demonstrate to an independent auditor that the data is not being changed or altered in any way as it traverses through the different components of the layers of the multi-lender architecture. Lender-specific information submitted via the lender portal 109 by the lender 120, to the lender confidential data service 108e, may comprise any rules or information that the lender may consider (e.g. via prequalification micro-service 108a) to assess the eligibility of prequalification for an applicant for lending, as well as assess product eligibility (e.g., via product eligibility micro-service 108b) for a product for which a prospective applicant seeks financing. For example, for the purchase of a vehicle, in assessing product eligibility via the microservice of 108b, such information may comprise attributes such as the make, model, trim, mileage, exterior and interior condition, accident history, etc. of a vehicle. The lender may combine these attributes in any manner, so as to choose only to lend to prospective applicants for financing vehicles which meet a certain condition. These conditions may comprise a combination of attributes, such as a mileage below a certain threshold for a particular make, or a customer only looking for a luxury vehicle, if for example the lender is targeting high-value purchases.

In a similar manner, for the same example of purchasing a vehicle, in assessing applicant eligibility at Prequal microservice 108a, lender-specific information submitted via the lender portal 109 by the lender 120, to the lender confidential data service 108e, pertaining to attributes for applicant eligibility may comprise, e.g., salary, geographic location, credit score, driving violation history, accident history, financial asset disclosure (e.g. existing bank accounts), the amount sought for financing of the desired product, etc. In a similar manner to the attributes for product eligibility for each lender, the lender may combine the attributes for applicant eligibility in any manner, so as to choose only to lend to prospective applicants which meet a certain criteria, such as having a credit score above a certain threshold level, being in a certain geographic region, etc. For example, some credit unions participating as lenders may have unique criteria used to determine eligibility requirements for loan applicants.

For assessing both applicant and vehicle eligibility, in combining attributes, Boolean logic such as AND, OR, XOR, etc. may be used to form conditions. In addition, machine learning logic including support vector machines (SVM), random-forest techniques, decision-trees, multilayer neural networks with backpropagation, etc., may be used for classification of the applicant, vehicle, or both in certain groups. As the applicant pool and vehicle pool grows, the applicant and vehicle data sets, or any subsets therein, may be used to train machine-learning classifiers. The classifiers may then be used to classify the data into groups of applicants or groups of vehicles by the prequal 108a and the product eligibility 108b microservices. These groupings may then be used for determining applicant and/or product eligibility, and can further be used in the Pricing microservice 108c. To conserve computing resources, the machine learning logic may be executed from and stored within physical memory present in computing resources 1022, comprising said memory and at least a processor coupled to said memory. In particular, the machine learning logic may be present as an application 1023-1 within a computer resource 1022 executed from memory. A plurality of such computer resources 1022 may form a backend platform 1015 as part of a cloud computing environment 1020, which may be accessed by a network gateway by the GUI 1106 of the Buyer UI 101. Resampling procedures including K-fold cross-validation may be used as well for higher accuracy in training datasets, and for initial training when datasets are small.

Figure 11:
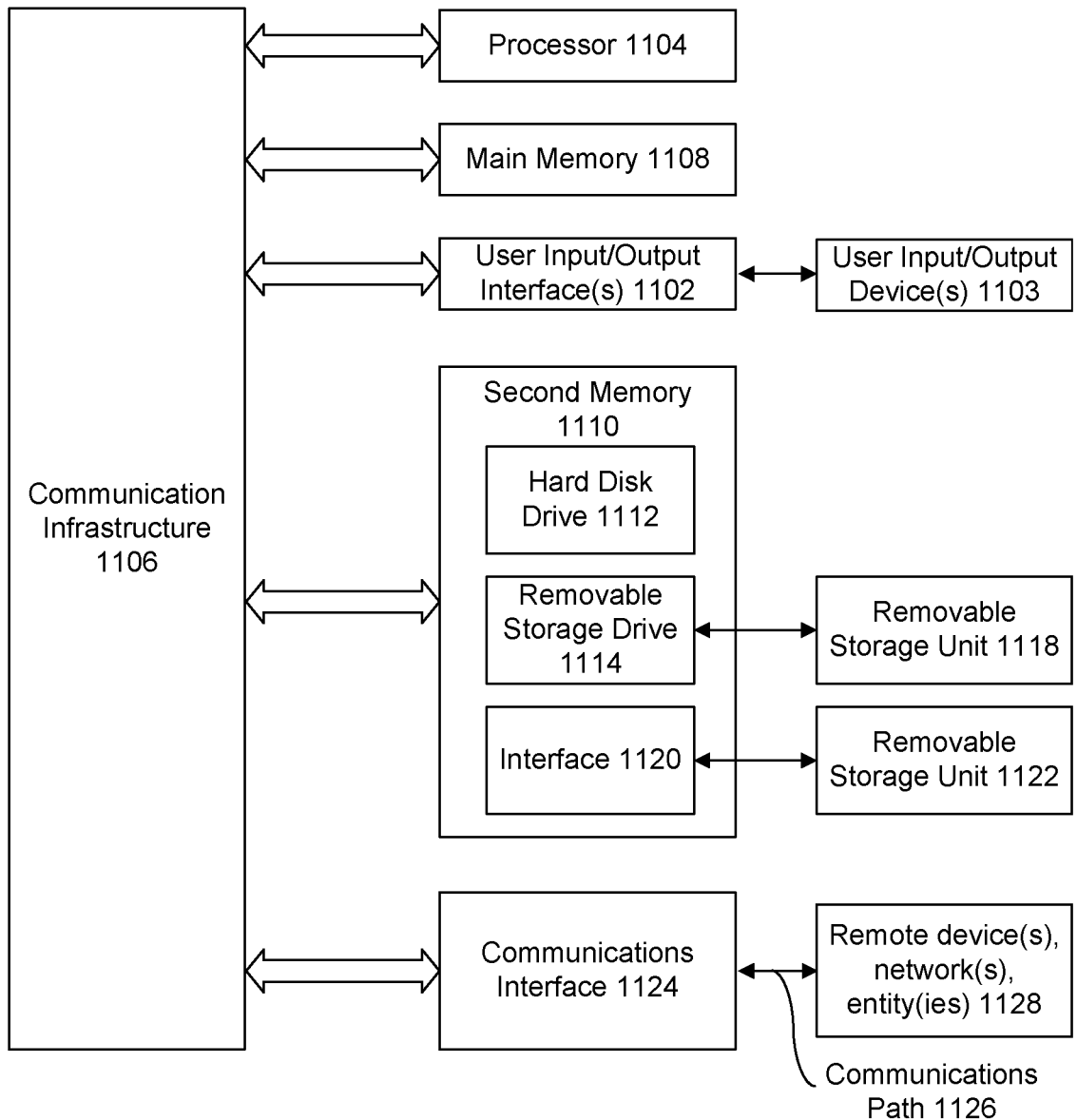
FIG. 11 is a block diagram of an example computer system.

Such eligibility decisions for the Product Eligibility microservice 108b and the applicant Prequal microservice 108a, as well as the pre-eligibility screening criteria (which will be described infra) may be based on the above-mentioned types of logic. For example, such eligibility decisions may be based on Boolean logic or machine-learning logic as mentioned, which the lender is able to input into the Lender Portal 109 in the form of rule sets, in addition to the type of criteria being assessed. Such a portal 109 may be a secure web interface on a hosted server utilizing HTTPS, SFTP, WebDav, or a third party cloud service (e.g. Amazon AWS, Microsoft Azure, etc.), which may take user input through files, form fields, etc. In an embodiment, the lender 120, as shown in FIG. 1, is able to input information into the lender portal 109 in the form of rule sets and executable instructions which may be lender-specific and non-standardized. Then, the self-contained lender confidential data service 108e in the vault 108 may run on these rule sets and executable instructions, to convert them autonomously to standardized instructions which can be parsed by the microservices 108a-108c of the lender-specific broker 114. These instructions in turn may be encrypted with a lender-specific key, where there is further a different lender-specific key for each lender specific microprocess, and stored in the Lender Confidential data repository 108f. The repository 108f in turn may be a data structure such as a database stored on a non-transitory computer readable-media, or on any combination of primary memory 1108 and secondary memory 1110, as shown in FIG. 11.

This lender information may be in the form of simple commands which are translated into standardized parse-able instructions in the form of machine-level code by the lender confidential data service 108e, which may e.g. be an interface application within the lender portal 109. To aid the lender in inputting rule sets and executable instruction, the web interface of the portal 109 may include having the lender choose the type of eligibility criteria to be assessed from drop-down lists and combining them with Boolean operators. On the other hand, the lender may be able to write their own shell code, and or scripts, in languages such as the Python scripting language, JAVA, SQL, C, MATLAB etc., and submit this written code as an instruction file, which may be able to operate using machine learning and/or Boolean logic as described above on the user information securely. This code is then converted, in an autonomous manner, by the lender confidential data service 108e within the vault 108, and encrypted, to standardized parse-able instructions by the microservices 108a-108c of the lender specific brokers 114, where said instructions are written to the Lender Confidential data repository 108f.

Additionally, the lender may be able to give feedback through the lender portal 109 on whether applicant leads generated by the pre-eligibility screening criteria (described infra) are suitable leads or not. In such a circumstance, the aforementioned machine-learning logic that is incorporated into the parse-able rules and present in the Lender Confidential data repository 108f may be able to learn from such feedback over time, by classifying the data against a number of features according to classifier weights. One example of training is the SVM, where features having the smallest weights are removed and the algorithm is re-trained with the remaining weights, wherein said process is repeated until features remain that are able to accurately separate the data into different patterns or classes. The removing of the features and re-training of the algorithm is conducted by the Lender Confidential data service 108e, taking into account the lender feedback from the lender portal 109 (the lender deeming whether a certain given lead is suitable or not for lending to), and rewriting the parse-able rules in the Lender Confidential data repository 108f accordingly. In this manner, a multi-dimensional separating hyperplane may be constructed.

Alternately, a neural network type algorithm may be used, such as a neural network with back-propagation, where there may be a weight matrix for each layer of the neural network, wherein for each layer a bias vector is defined. The weights are then multiplied by the input signals, and applying activation functions, the output may be calculated. Backpropagation aids in computing the error of partial derivatives, which error can then be minimized across layers. Such backpropagation can form the central mechanism by which the neural network learns. Again, in this example as well, the Lender Confidential data service 108*e* may take into account the lender feedback from the lender portal 109 in the backpropagation (whether a lead is deemed suitable or not) to compute error, and may use this feedback to adjust the weight matrix, etc., and rewrite the parse-able rules in the Lender Confidential data repository 108*f*. This may aid in discovering trends for classification wherein resources of a particular system may be more likely to be used.

In addition, attributes of the applicant Prequal microservice 108*a* may be combined with attributes of the product from Product Eligibility microservice 108*b* to create composite condition requirements. For example, one such composite requirement may be where for a product purchase of a vehicle, a certain lender may only lend to an applicant with a credit score above a certain threshold, only for a particular make or makes of vehicles, at a certain mileage threshold, etc. In another example, a lender targeting luxury vehicles may only consider lending to high net worth individuals with a threshold credit score, etc. Any permutation or combination of attributes between the two steps is possible to create composite eligibility conditions, which may account for agreements certain lenders may have with certain sellers of products, and vice versa.

In FIG. 1, after the applicant eligibility may be assessed by the prequal 108*a* microservice, and the product eligibility may be assessed by the product eligibility 108*b* microservice, the further lender-specific rules and executable logic comprised in the Lender Confidential data repository 108*f* may be used by the Pricing microservice 108*c*, to determine potential terms of financing for the product by a particular user/buyer. Using both the applicant prequal 108*a* results and the product eligibility 108*b* results, the pricing 108*c* microservice may use lender-specific information such as pricing grids, matrix-based manipulation, lender-specific mathematical formulas, etc., to combine the applicant based attributes and the product based attributes, as described above, to determine financing terms such as fixed or variable APR's, maximum amount that an applicant may borrow, length of financing, required minimum monthly payment, prepayment penalties, required balloon payments, among other terms. These terms may then be sent as encrypted output from the Vault 108, as will be described infra, through the API Passthru 107, and to the Buy/Sell API 106.

Figure 2:
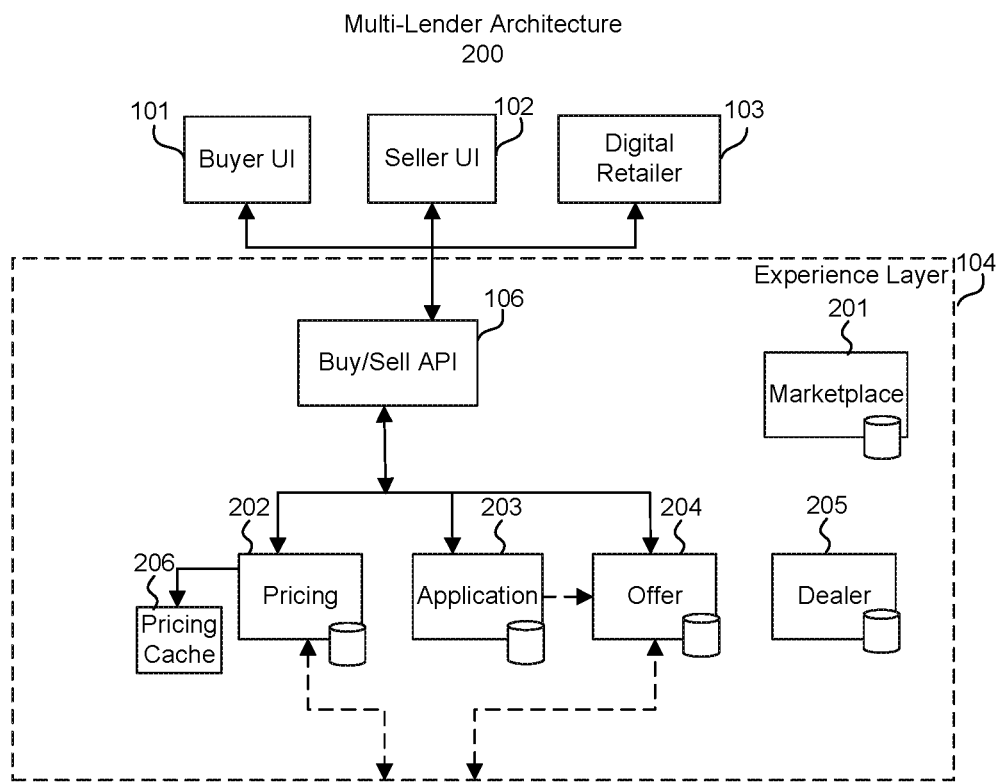
FIG. 2 is a block diagram showing an expanded view of and example of the Experience Layer and the working flow of the Buy/Sell API within the Experience layer according to an embodiment.
Figure 10:
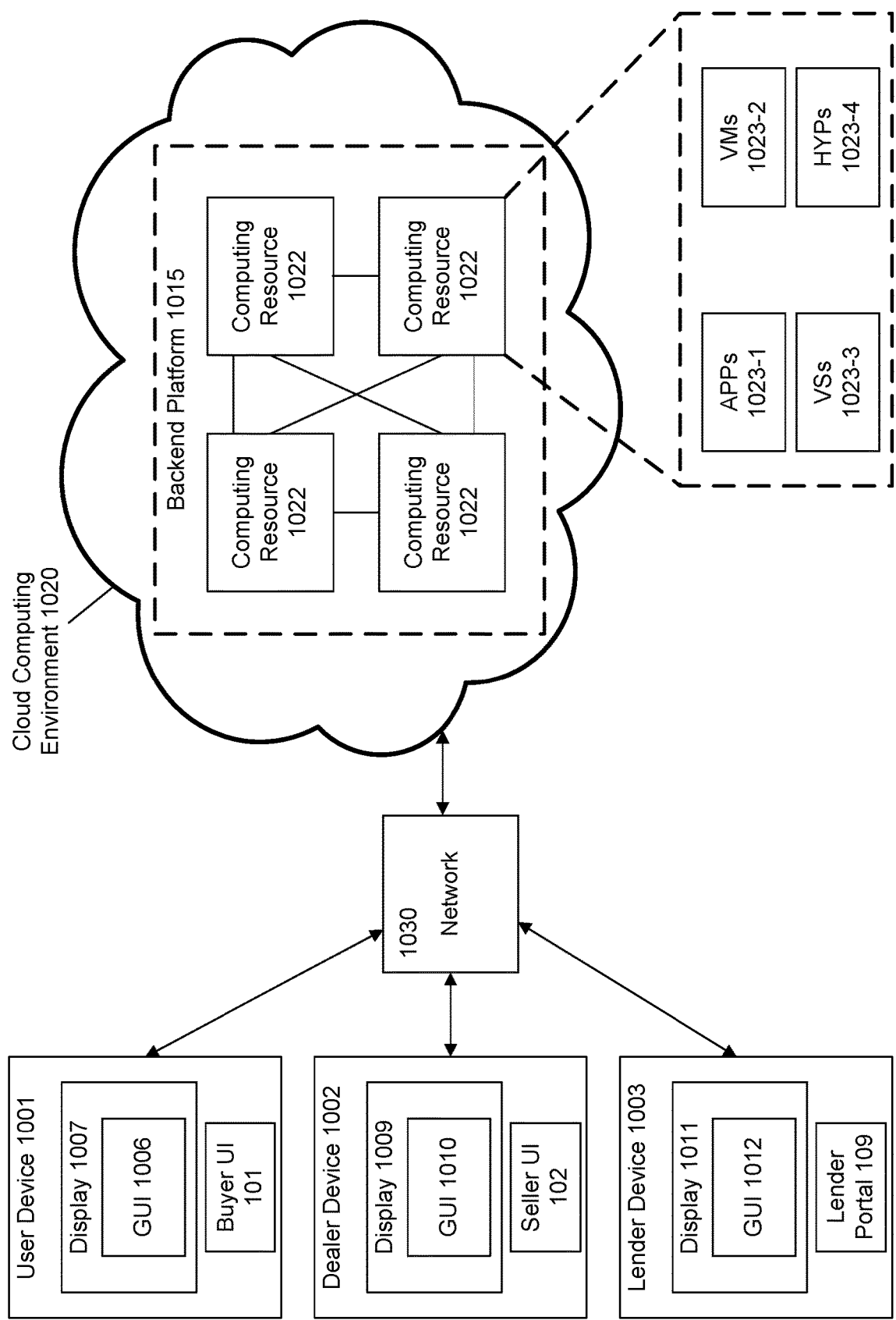
FIG. 10 is a block diagram of an example network environment.

The Buy/Sell API 106 is also present as shown in Multi-Lender Architecture 200 of FIG. 2, which shows the Experience Layer 104 of FIG. 1 in greater detail. In FIG. 2, the offer repository 204 is tied to a particular user application in the application repository 203, where both repositories 203 and 204 are segregated by user session for different users. For example, for a particular user application in application repository 203, when pricing conditions are determined by the Pricing microservice 108*c*, these may be output to pricing repository 202. From here, the Buy/Sell API 106 may decrypt the lender-specific information associated with a particular application as lender-agnostic output from the offer repository 204, application repository 203, or pricing repository 202 to display inside of a user-session in a GUI 1009 of the Buyer UI 101, as shown in FIG. 10. For example, the Buy/Sell API 106 and may use the terms output by the Pricing microservice 108*c* as present in the pricing repository 202 for a particular user application, to populate the fields of an offer from the offer repository 206 corresponding to the same application, inside of a GUI 1006 of the Buyer UI 101 as shown in FIG. 10, so that a user may see the terms of a potential loan by a lender, or plurality of lenders, for a specific product. This can be done for multiple lenders collectively, wherein the vault may send encrypted output in a lender-agnostic form from multiple lenders processed in parallel in the vault, in one payload to the experience layer 104. In this case, the buy/sell API 106 decrypts the lender-agnostic output for a plurality of lenders at once from the Pricing repository 202 for a particular user application, and may use it to populate the fields of an offer from the offer repository 206 corresponding to the same application, to display it in a universal, user-friendly, and aesthetically uniform format to the user.

Figure 9:
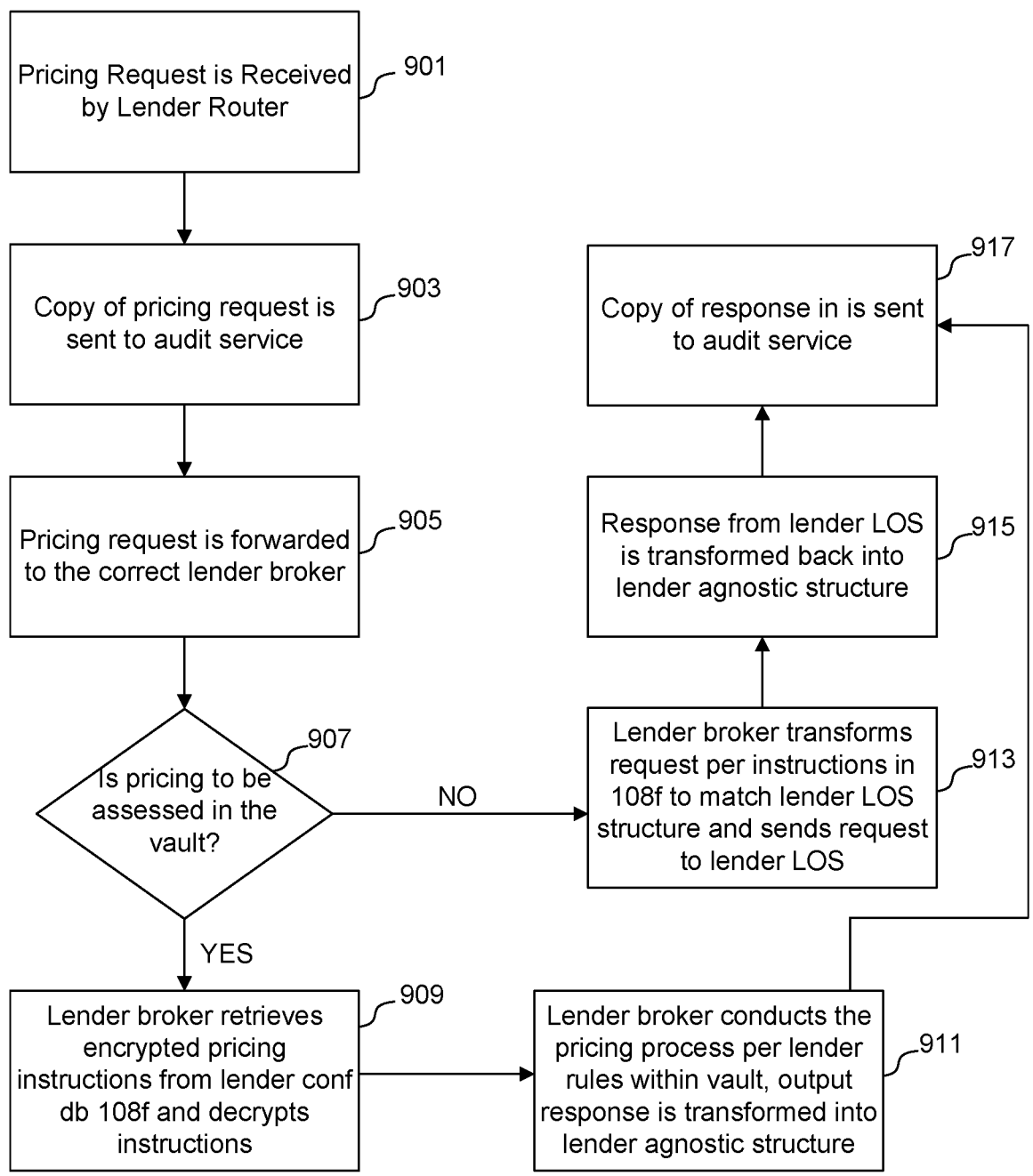
FIG. 9 is a flowchart showing the flow of how a pricing request is evaluated.

Through the Lender Portal 109, which as described may in an embodiment be a cloud-based portal, the lenders may access the Multi-Lender Layer 105. As shown in FIG. 1, the Multi-Lender Layer 105, through Lender Confidential data service 108*e*, is able to relay pricing rules and executable logic from the lender 120 to the Lender Confidential data repository 108*f*. From here, the lender specific broker 114 for a particular lender can use these rules and logic to conduct its pricing process within the vault or in a third party loan origination system (LOS) in an alternate embodiment, as will be explained later with reference to FIG. 9. Regardless of which embodiment conducts the pricing process, the resulting response with pricing terms, in steps 911, or 915 of FIG. 9, is transformed into a lender-agnostic structure by using the encryption service 115. Through this encryption service 115, the lender-specific output is encrypted in a secure, universal format, that is the same for all lender-specific output from various lenders 120.

Figure 6:
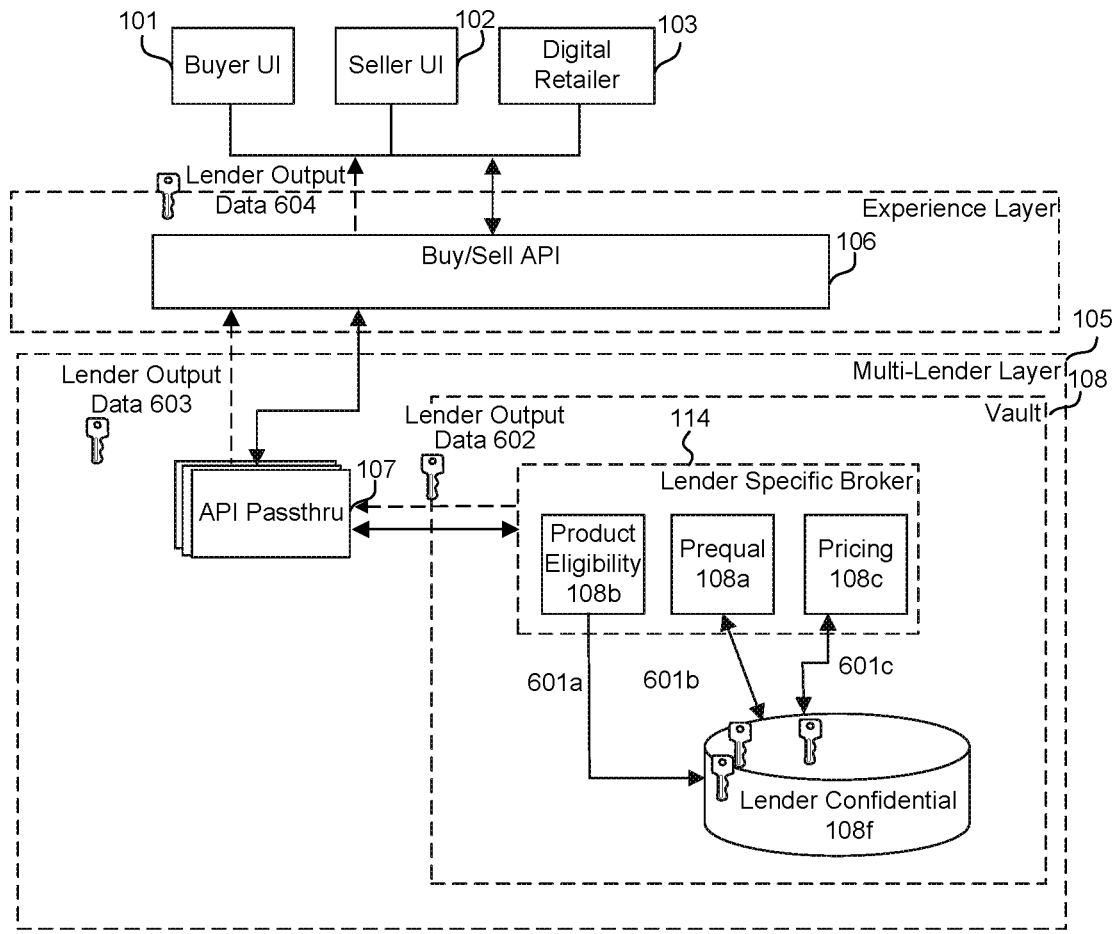
FIG. 6 is a block diagram showing the flow of lender-agnostic data from the vault to the experience layer and ultimately the user experience layer.

FIG. 6 shows the flow of the lender-specific output through the multi-lender architecture in a lender agnostic format. As shown by dashed arrow 602, this lender-specific output is relayed, encrypted in a lender agnostic format, from the lender specific broker 114 (can be through the lender router 116 in FIG. 1 or directly from the lender specific broker 114 as shown in FIG. 6) to the API Passthru 107 in a lender-agnostic format. From here, the data of lender-specific output for one or more lenders is relayed onward to the Experience Layer 104 as shown by dashed arrow 603. From here, as explained above with reference to FIG. 2, the Buy/Sell API 106 within the experience layer decrypts the lender-agnostic data, from where it is displayed in a particular user session of the user-facing interface applications 101-103. This decryption and displaying in the user session is shown by the dashed arrow 604 in FIG. 6. As a result of this information flow, although each lender's specific output is segregated in the vault, it can be compiled into a universally encrypted lender agnostic composite payload, where information for each lender is displayed in a universal format with regard to loan and pricing terms to the user in e.g. a user session of the Buyer UI 101. Further, no external tools can access the memory in said user session, and thus the information is delivered in an end-to-end encrypted manner from the vault 108 to the user-facing application Buyer UI 101.

Information is stored in vault 108 in a secure and encrypted manner, wherein the vault is a jailed, secured, self-contained network within the multi-lender architecture, configured to receive and transmit data in an encrypted format. In an embodiment, the vault 108 may prevent access to physical hardware, and may be located on a remote hosted server as a cloud network, as shown in FIG. 10 and will be explained later. In this self-contained network, lenders manage their own separate accounts, and no one except for the lender, including even the administrator of the multi-lender architecture, is able to view lender confidential information inside Lender Confidential data repository 108f. Lenders may only view their own data inside the Vault 108, through specific provisioned keys (e.g. 601a-601c described above) accessible through the lender portal 109 which operates as described above. Consequently, lenders may not view data associated with other lenders. This is possible by having separate encryption keys for each specific lender.

These separate keys are shown in FIG. 6. For greater security there are two layers for individual keys. The first layer is segregated by specific lender. Below this layer, in a second layer, rules and executable logic pertaining to each separate microservice/microprocess (e.g. prequalification, product eligibility, and pricing) may be provisioned with their own encryption key for each respective microservice. This is shown in FIG. 6 by a first layer key shown at the flow of lender output data 602 from the lender specific broker 114 of a particular lender to the API Passthru 107, and three separate second layer keys 601a, 601b, and 601c used by microprocesses 108b, 108a, and 108c respectively for the particular lender. These three second layer keys are used to access standardized parse-able lender specific rules and executable logic in the Lender Confidential data repository 108f for a particular lender and for a specific process of that lender (e.g. prequalification, product eligibility, or pricing). In this manner, each lender specific process in the vault has access to only one of these keys with specific privileges, ensuring access to data is segregated to the maximal extent possible, enhancing security, and limiting access to trusted components. Further, because the Lender Confidential data service 108e parses the individual lender rules for these processes in a standard format interpretable by the microprocesses 108a-108c, these microprocesses, for each specific lender broker, may be autonomous processes running inside the vault itself.

The data and coding scripts run by individual lenders inside the vault 108, because the vault is a self-contained and jailed structure (e.g. in the form of an autonomous cloud application hosted on a remote server as described above), may not be visible to users through the Buyer UI 101, Seller UI 102, or Digital Retailer 103 interface applications. Through inputting lender confidential information which may include user information as well as Boolean and/or machine learning logic to apply to said user information from the individual lender portal 109, each lender is able to securely manage its eligibility criteria, rules, filing policies, and/or the like. Further, within the lender portal 109 of FIG. 1, if the lender is e.g. an organization where only certain people are permitted to view product eligibility information vs. prequalification information vs. pricing information, the provisioned keys for each specific lender process (e.g. 601a-601c described above) can be provisioned accordingly. As a result, certain parts of the lender organization with permitted access to a specific microservice's rules or executable logic can log into the lender portal 109 with the appropriate key to access or edit this information.

In an embodiment, lenders may use the interface of the Lender Portal 109 to upload and/or communicate information associated with their lender-specific requirements and eligibility rules, which is then interpreted in a standard parse-able format for microservices 108a-108c by the Lender Confidential data service 108e, and wherein the standard parse-able translated rules and executable logic are written to the Lender Confidential data repository 108f. The requirements and rules may include rules, algorithms, equations, restrictions, scripts (as described above) and/or the like, which govern the process of offering users loans for products, such as automobiles, at determined prices. The requirements and rules for each individual lender is lender-specific, and therefore must be confidential and can be safely stored in the vault. The information stored in the Lender Confidential data repository 108f may then be run through self-contained software modules within the vault.

In an embodiment, the information received and stored may be decrypted by the trusted autonomous microprocesses 108a-108c of a specific lender broker 114 for applying said rules/logic to user information, wherein the output is encrypted by the encryption service 115 and stored in an encrypted format. A user may interface with Buyer UI 101, Seller UI 102, or Digital Retailer 103, in an attempt to obtain pricing information for a loan for an automobile or other good/property. In one embodiment, the Buyer UI 101, Seller UI 102, or Digital Retailer 103 application may each render different graphical user interfaces (GUIs) 1006, 1010, and 1012, respectively, as shown in the computing environment shown in FIG. 10, configured to receive input from the user which may be transmitted to the multi-lender layer 105 for further processing, for example to obtain pricing information for a loan for an automobile. The input information may be transmitted to the multi-lender layer 105 through the Buy/Sell API 106.

The API interaction of the Buy/Sell API 106, API Passthru 107, and Vault 108 in assessing applicant and vehicle eligibility, as well as general use of the vault, will herein be described in more detail. As shown in FIG. 2, there may be a Buy/Sell Marketplace, which is designated as Marketplace 201, present in the Experience Layer 104. The Marketplace 201, through the Buy/Sell API 106, may be rendered in the GUI 1006 of the Buyer UI 101 user interface. In this Marketplace 201, an inventory of available products, such as vehicles (in the example of a vehicle purchase), may be displayed to the user in a dynamic and continuously updated manner. The flow of the Buyer UI 101 interface with respect to a single lender may be shown under the UI 301 column in FIG. 3.

Figure 3:
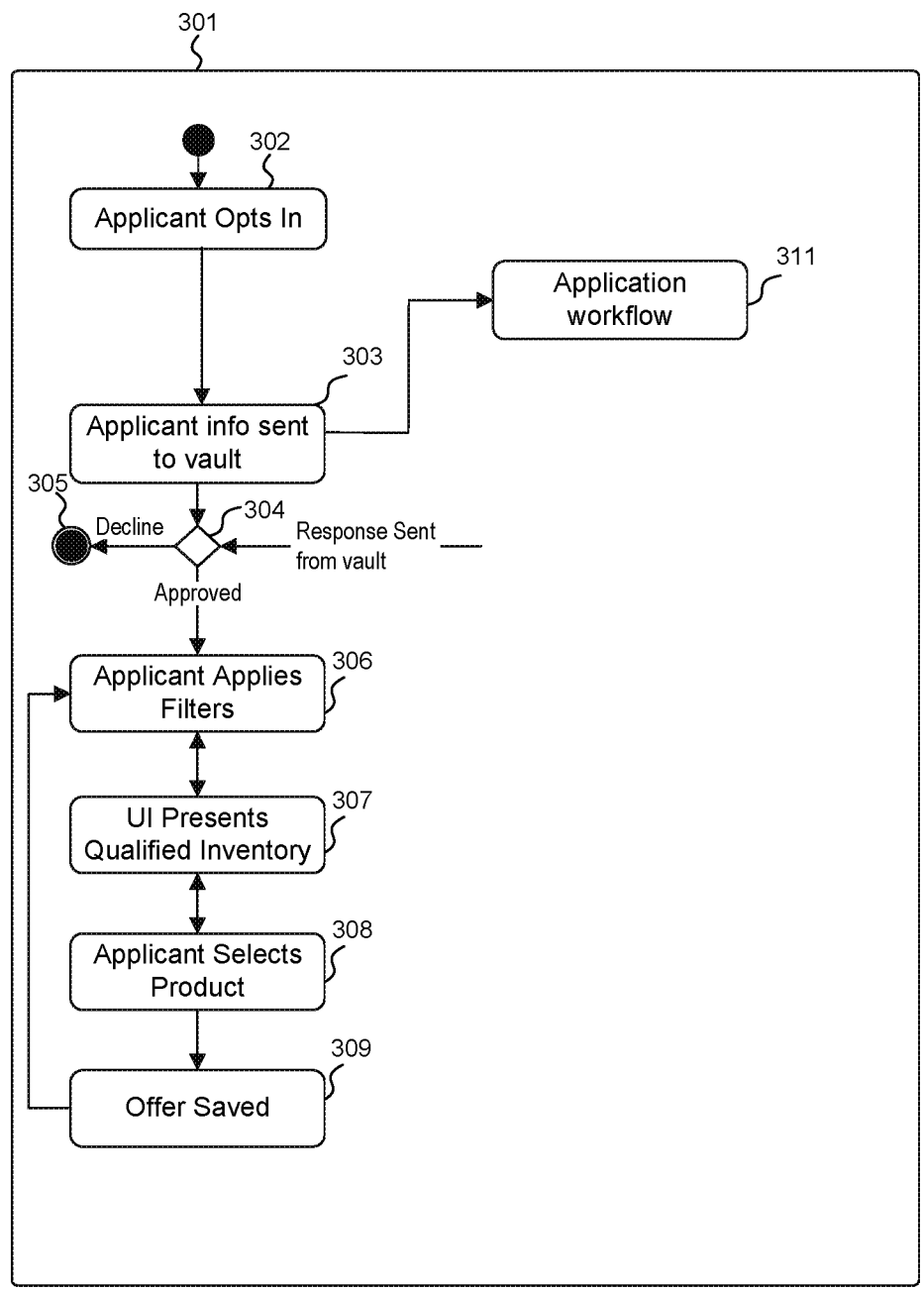
FIG. 3 is a flowchart showing an example flow through the multi-lender platform architecture for one lender.

With respect to a single lender as shown in FIG. 3, the user in the user-facing application 101, through the GUI 1006, may disclose their financial credentials and apply for lender prequalification under the Applicant Opts In step 302. At this point the applicant information is sent to the vault 108 in step 303, and an application workflow 311 is created, wherein an entry is made for a new application in the application repository 203 of FIG. 2 described above. As will be explained infra, in an embodiment analogous microservices for any combination of 108a-108c may be performed under a $3^{rd}$ party API 111a instead of vault 108, and may be used to assess lender prequalification, product eligibility, and/or pricing. In this case applicant information may be still first sent to the vault 108, from where it is routed to the third party API, as will be explained with respect to FIGS. 7-9. For example, the information may be routed to a third-party based system, such as a website, used for performing microservices 108a-108c, and the outputs from said microservices may be aggregated by the lender specific broker 114 within the vault 108. In an embodiment, before the user discloses their financial credential and applies for lender prequalification, a full inventory of products to be purchased, such as vehicles, appliances, real property, etc., may be displayed, depending e.g., on the user's geographic location, wherein the microservices 108a-108c can then take into account the user's selection of vehicle when assessing applicant eligibility/pricing. In an alternate embodiment, no products, such as vehicles, may be displayed unless the user sends their information to the vault first, under step 303, and successfully applies for lender prequalification (e.g. the prequalification microservice 108a returns a positive result, which comes back as 'Approved') under step 304. This is the embodiment shown in FIG. 3 with respect to a single lender.

In either of the above embodiments, once products are displayed, a full list of associated prospective lenders may be displayed along with the products, and this list may be dynamically adjusted as the user inputs his/her financial credentials, and this information is processed by the microservices (e.g. 108a-108c) for lender specific brokers 114 in the Multi-Lender Layer 105. The user Applicant may also apply his or her own user-selected filters with product attributes, such as shown in Applicant Applies Filters step 306 of FIG. 3, for certain attributes of said products. For example, for vehicles, attributes such as Make, Mileage, Color, Trim, Geographic Location, etc., may be used by the user to narrow down the list of products. Finally, within the list of dynamically displayed products for which the Applicant is eligible after relevant microservices have run (e.g. prequal 108a or product eligibility 108b microservices for a lender-specific broker), the Applicant may select a desired product for purchase for which he/she is prequalified and eligible to purchase from a specific lender under Applicant Selects Product step 308. Finally, as will be explained below, once step 308 has been performed, an offer is generated from a loan origination system (either 112a or 111a in FIG. 1) and is saved in the offer repository 204 in the Experience Layer 104.

The user can, as described above, enter their applicant information into entry fields in the GUI 1006 of the Buyer UI 101. In an embodiment, before said information is relayed to the Multi-Lender Layer 105 by the Buy/Sell API 106, the user's information is first checked against pre-eligibility screening criteria. This criteria acts as a decision funnel by the administrator of the Multi-Lender Architecture, in order to filter which lenders the user's application is suitable for and should be sent to. For example, in an embodiment, if the administrator of the Multi-Lender Architecture is themselves a lender, the user's application may be sent to other lenders when the administrator based on its own decision making policies is not able to lend to the user. In another embodiment, the system of the Multi-Lender Architecture 100 may present multiple options to a user, and may send the user's application to other lenders even if the system finds that based on a lender-administrator's decision making policies the lender-administrator is able to lend to the user. In this embodiment, the user may first be searching through an inventory of products in the Marketplace 201, as displayed in GUI 1006 of the Buyer UI 101 user interface, without electing any specific lender. Then, after the customer has chosen a vehicle of his or her desired choice, they may enter their personal and financial information, such as salary, geographic location, credit score, driving violation history, accident history, financial asset disclosure (e.g. existing bank accounts), the amount sought for financing of the desired product, etc. Then, the system 100 conducts the pre-eligibility screening criteria assessment through the Buy/Sell API 106 within the Experience Layer 104 of the system 100, before information is relayed to Multi-Lender Layer 105.

During the pre-eligibility screening criteria assessment by the system 100, the Buy/Sell API 106 compares the user's entered information against a ruleset implemented by the administrator of the Multi-Lender Architecture, concerning a subset of this information (rules concerning e.g., only credit score, zip code, and age). Such a ruleset may be comprised from Boolean operators and/or machine learning logic described above operating on the subset of relevant user information, such as, in this example, on score thresholds for credit score, geographic thresholds for zip code, or age thresholds for age. Then, for lenders for which the user is eligible after being pre-screened with this criteria, to direct the user to lenders with a high chance of approving the user's application, the user is asked if they consent to provide their information to the lenders on the GUI 1006. Based on their response, the user has the option to proceed with getting prequalified under the prequal service 108a as explained above, and to proceed further in their loan application process for lenders which the pre-eligibility screening criteria deems the user likely to be eligible under prequalification and vehicle eligibility.

The pre-eligibility screening criteria assessment can take place in a plurality of ways. The pre-eligibility screening criteria assessment may take place in a cascade-like manner, wherein using the example of credit score and zip code, a credit pull may first be made with a third-party service for assessing the user's credit score, in the same manner as will be explained infra in the prequal 108a micro-service. If the credit score is found to be above a predetermined threshold, then the pre-eligibility screening criteria assessment may proceed to the next step, which may be zip code. If the user is found to be within a certain zip code, then the pre-eligibility screening criteria assessment may proceed to a further step, wherein other criteria may also be considered. If all of the criteria are satisfied for a particular lender by the user's information, the lender may appear as a selectable option in the GUI 1106 of the Buyer UI 101 for a specific vehicle or vehicles. Otherwise, if at any point in the cascade any condition is not met, the pre-eligibility screening criteria assessment may be interrupted, the evaluation stopped, and the respective lender option may be greyed out or crossed out in the GUI 1106 of the Buyer UI 101.

In an embodiment, before even searching through any of the inventory of vehicles present in the Marketplace 201, and before the Marketplace 201 is even rendered on the GUI 1006 of the Buyer UI 101, the user may first be asked if they would like to opt in for prequalification under the financing system of the administrator lender of the multi-lender architecture, if the administrator is also a lender. If the administrator is not a lender, or if the user does opt to prequalify under the financing system of the administrator lender, then the pre-eligibility screening criteria determines further which lenders the customer may be eligible to attempt prequalification for.

Another example is that without even picking a specific lender, the GUI 1006 may display an inventory of vehicles in the marketplace 201 to the user, each which may be financed by several possible lenders. When the user chooses a vehicle within the marketplace 201, a list of possible lenders may appear. At this point, the user's personal and financial information may be obtained through a series of prompts displayed in the GUI 1006, wherein the information may be stored in the Application data repository 203 as displayed in FIG. 2. After the pre-eligibility screening criteria assessment is run, based on the results of the assessment the list of possible lenders may have several lenders greyed out, or otherwise displayed as incapable of being applied to (e.g. cross through, redlining, etc.). Then, out of the remaining possible lenders that appear for the vehicle, the user may continue the process of applying for a loan, whereby the Buy/Sell API 106 may then relay the user's entered personal and financial information to the Multi-Lender Layer 105 for further eligibility evaluation.

A reason the pre-eligibility screening criteria assessment may be conducted as a preliminary screening process, even before lender qualification, is to generate a positive experience for the user. In essence, even before undergoing lender prequalification, the user undergoes a prequalification provided by the administrator of the multi-lender architecture, in order to group lenders for which the user might have a higher chance of qualifying for together, so as to enhance user experience. In this manner, the prospect of a high probability of facing a rejection is pre-mitigated before the process of qualification in front of individual lenders is even attempted. This pre-empts user frustration occurring from being rejected by a lender, wherein the preserved customer goodwill may translate to return on investment. In the example where the product is a vehicle, for both dealers and lenders, this preserved customer goodwill can add value to both parties, as well as to the user, in the car purchasing process.

Under the pre-eligibility screening criteria, in addition to Boolean and/or machine learning logic being applied in the form of rule-sets to user information, the determination of when to eliminate a lender from the list of lenders that the user may apply to may also depend on an electronic score that is computed. This score may be computed from the subset of personal and financial information of the user assessed, wherein when the score is below a predetermined threshold, then the lender may be eliminated from the list of lenders being displayed. Alternatively, the UI may notify the user and give the user the option, even when the score for the user is below a predetermined threshold, to apply to the lender. This gives the user the option to over-ride the greying out or crossing out of the lender on the UI, if the user still wishes to apply to a particular lender, even knowing that they face a high probability of rejection of qualification. This may be useful in case the user has a preference for a particular lender. This action may take place, e.g., by double-clicking on the greyed out or crossed out lender entry in the UI. In this manner, full flexibility may be given to the user. This cascade-like manner of evaluation may also be used for the prequal, vehicle eligibility, and pricing microservices 108a, 108b, and 108c, respectively, as described infra.

In the Application Workflow step 311, the Vault 108 may process the pre-qualification, vehicle eligibility, and pricing information associated for assessing applicant eligibility, vehicle eligibility, and if eligible, building a loan offer for multiple lenders, in parallel, using proprietary information provided by each lender. As described above, the Vault 108 may be a jailed environment, such that, while the lenders may provide their proprietary information for building a loan offer to be stored in the vault 108, the lenders or users may not access or view other lenders' proprietary information for building a loan offer. This configuration provides a technical advantage over conventional systems because this configuration is able to generate multiple loan offers from various lenders in parallel using each lender's proprietary information while maintaining a secure jailed environment that restricts access or visibility to the lenders' proprietary information.

Figure 4:
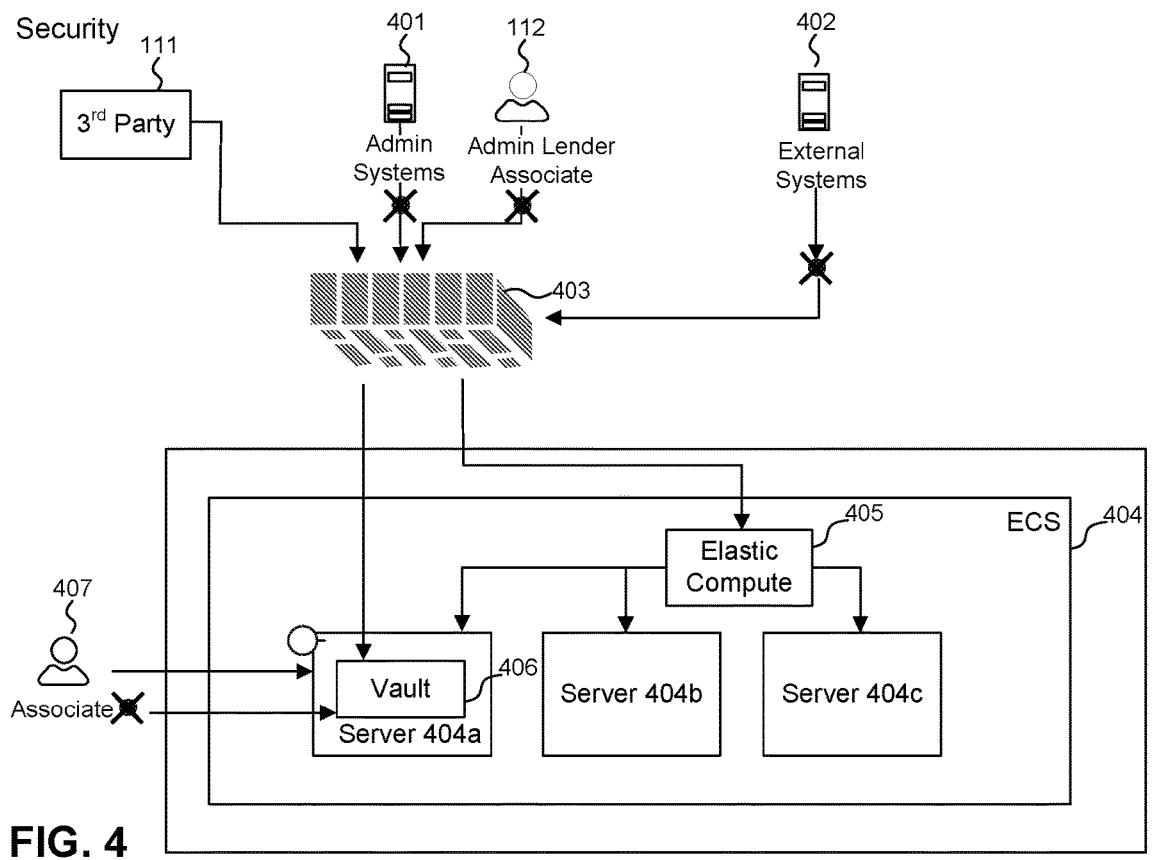
FIG. 4 is a block diagram showing an example of third party access to the Elastic Compute Service (ECS) through a firewall.

The jailed nature of this environment is further shown in FIG. 4. As shown in this figure, neither the associate 407 of a server hosting the vault 108 environment, nor the administrator systems 401 or the administrator lender associate 112 administrating the Multi-Lender Architecture, nor external systems 402 can access the vault 406 (wherein the vault 406 in FIG. 4 corresponds to the vault 108 in FIG. 1). Only the third party lender 111, through their individual specific private encryption keys, as described above, may be able to penetrate through a firewall 403 and access lender confidential information in Lender Confidential data repository 108f located in vault 108, through the lender portal 109. The lender portal 109 may be located on a server 404b or 404c of an elastic computing architecture 405, which has access to the vault 406. It is noted that although the associate 407 of a server 404a hosting the vault 108 environment has access to the server 404a itself, they do not have access to the vault 406.

As explained, for the example of a car purchase, the user may choose a desired vehicle in the inventory displayed in the Marketplace 201, within the Buyer UI 101 application interface, rendered on the GUI 1006. After the user chooses said vehicle, the Buyer UI 101 application may present a selection for requesting the user to get pre-qualified on the GUI 1006, which the user can then select. Alternately, the Buyer UI 101 application may not display any inventory of products to begin with, and instead may ask the user to get pre-qualified first. In either case, in response to the user selecting the request for getting pre-qualified or the Buyer UI 101 requiring the user to be pre-qualified, the Buyer UI 101 application may transition to receive input from the user associated with the user's personal and financial credentials information (e.g., name, address, bank accounts, annual income, employment history, social security number, liabilities, and/or the like). The Buyer UI 101 may encrypt this personal and financial information, and transmit the encrypted personal and financial information along with a prequalification request to the Multi-Lender Layer 105, via the Buy/Sell API 106. Alternatively, the Buy/Sell API 106 may collectively encrypt the personal and financial information and pre-qualification request, and transmit the encrypted personal information and pre-qualification request to the multi-lender layer 105.

The API Passthru 107 may receive the personal information of the user as well as the pre-qualification request from the Buy/Sell API 106, in the multi-lender layer 105. The personal and financial information, as well as the pre-qualification request in some embodiments as described above, may be encrypted in a lender-agnostic universal format, as described above. Such encryption may take place through protocols such as PGP, RSA, AES, 3DES, TLS, SSH, IPsec, etc. The API Passthru 107 may be an API gateway. The API Passthru 107 may be an interface between APIs and micro-services (e.g., Prequalification 108a, Product Eligibility 108b, and Pricing 108c, through the lender router 116, as well as an interface between loan origination systems from Admin Lender AF 112 or a Third Party API 111, as will be explained infra). The API Passthru 107 may forward the encrypted personal and financial information along with the pre-qualification request to the correct lender router 116 in the vault 108.

Figure 7:
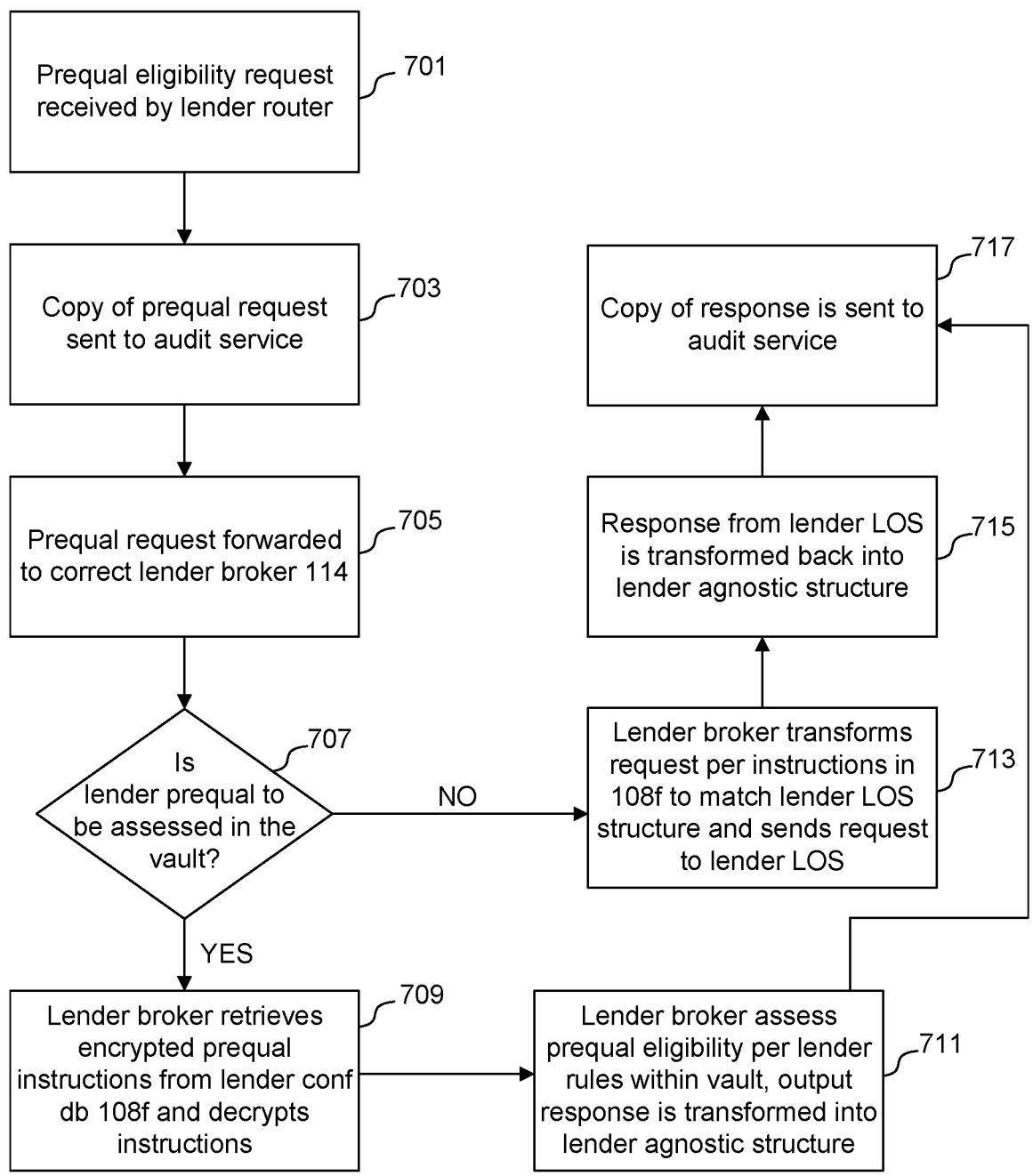
FIG. 7 is a flowchart showing the flow of how a prequalification eligibility request is evaluated.

The process is shown in the flow chart of FIG. 7. As shown in FIG. 7, at step 701, this prequalification request may first be received from the API Passthru 107 within the vault by the correct lender router 116 associated with a prospective lender that the user is potentially interested in applying to. A copy of this prequalification request may also be sent to the audit service 117 in step 703. Audit encryption keys to encrypt the request on a lender-specific basis may be retrieved from Encryption Key Server 118. That is, for each lender for which the prequalification request is requested, a log entry would be made using a specific audit-entry key for that lender. Then, in step 705, the lender router 116 in turn functions to send the encrypted personal and financial information along with the pre-qualification request to the lender specific broker 114 within the vault 108.

At step 707, once the prequalification request has been sent to the lender specific broker 114, there are two embodiments for subsequent steps of fulfilling the prequalification request. In one embodiment ("YES" at step 707), the lender prequalification eligibility analysis is performed by microservice 108*a*, as per inputted lender rules and executable logic in the Lender Confidential data repository 108*f*, in the vault itself. In this embodiment, in step 709, the lender specific broker 114, through the prequalification eligibility microservice 108*a*, retrieves the lender encrypted prequalification rules and/or executable logic from the Lender Confidential data repository 108*f* using the lender specific key 601*a* described above. Further, in step 709, the lender specific broker 114, through microservice 108*a*, may decrypt the encrypted personal information and pre-qualification request which has been encrypted in the lender-agnostic universal format sent from the API Passthru 107. Then, using the decrypted rules retrieved by the lender confidential database 108*f* through using the specific lender key for the prequalification 108*a* microservice (e.g. 601*a* as described above), in step 711, the lender specific broker 114 may execute the Prequalification 108*a* micro-service. The microservice may be executed per the decrypted lender rules and/or executable logic within the vault on the decrypted user information, and the system 100, within the vault 108 may re-encrypt the output of the microservice, using the encryption service 115 in FIG. 1, into one of the lender-agnostic universal formats described above. A copy of the output response is sent to the audit service 117 at step 717.

In an alternate embodiment ("NO" at step 707), the lender prequalification may be performed by a prequalification service within a third party lender loan origination system ("LOS") 111*a* using third party API 111. At step 713, the lender specific broker 114, through the prequalification microservice 108*a*, using the lender-specific key 601*a*, retrieves lender encrypted rules and/or executable logic not to perform the prequalification eligibility analysis, as in the previous embodiment, but to transform the parameters of the prequalification request so that it may be inputted to the third party API 111 to be executed by the third party LOS 111*a* for performing prequalification eligibility analysis. At step 715, an output response is submitted from the third party lender LOS 111*a* back to the lender specific broker 114, as shown by the bidirectional arrow from the LOS 111*a* to the lender specific broker 114 in FIG. 1. This response may be encrypted with a lender-specific key (e.g. 601*a*) that the lender specific broker 114 has access to, in order to decrypt upon receipt by the lender specific broker 114. At step 715, using the lender-specific key 601*a* the lender specific broker 114 then decrypts the lender LOS 111*a* response and re-transforms the parameters to match the universal format of the Multi-Lender architecture (e.g. where it matches parameter-wise the output in step 711 of the other embodiment). Finally at step 715, the output response after having its parameters re-transformed to match the universal format, is re-encrypted, using the encryption service 115 in FIG. 1, into one of the lender-agnostic universal formats described above. A copy of the output response is sent to the audit service 117 at step 717.

Figure 5:
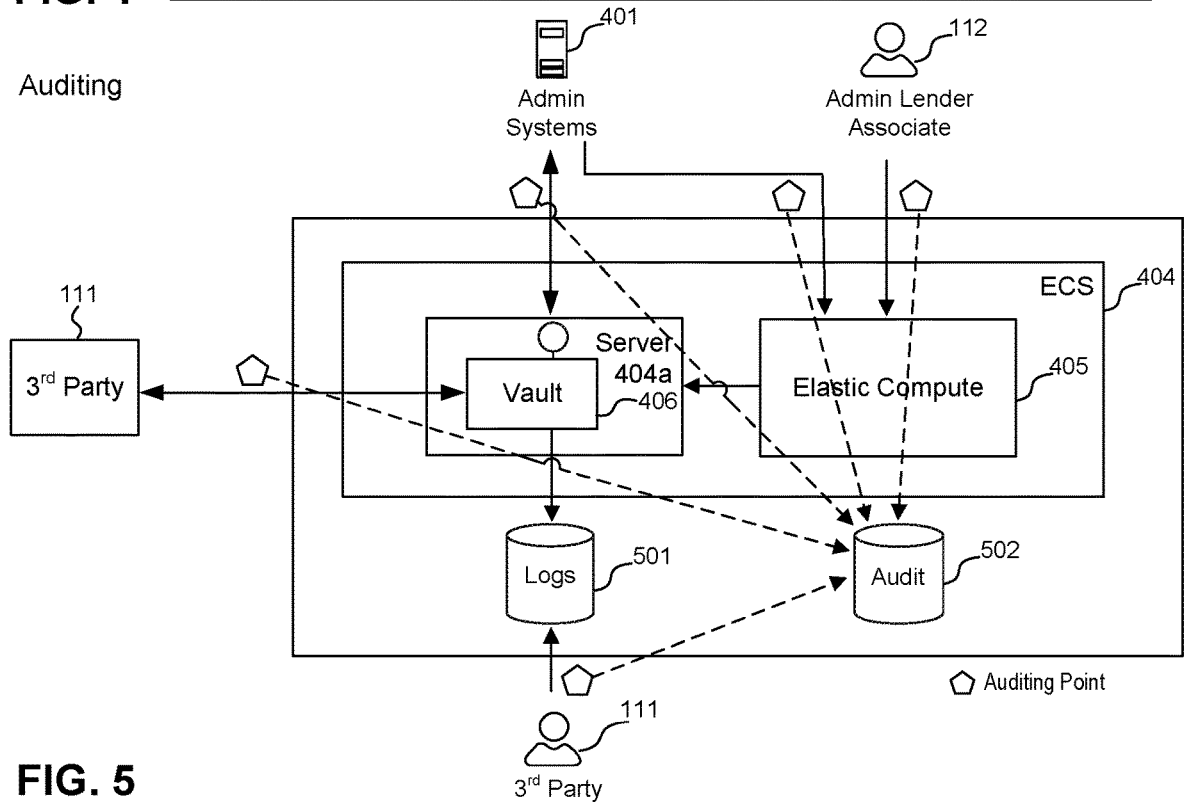
FIG. 5 is a block diagram showing an example of different auditing points for communications into and out of the ECS.
Figure 8:
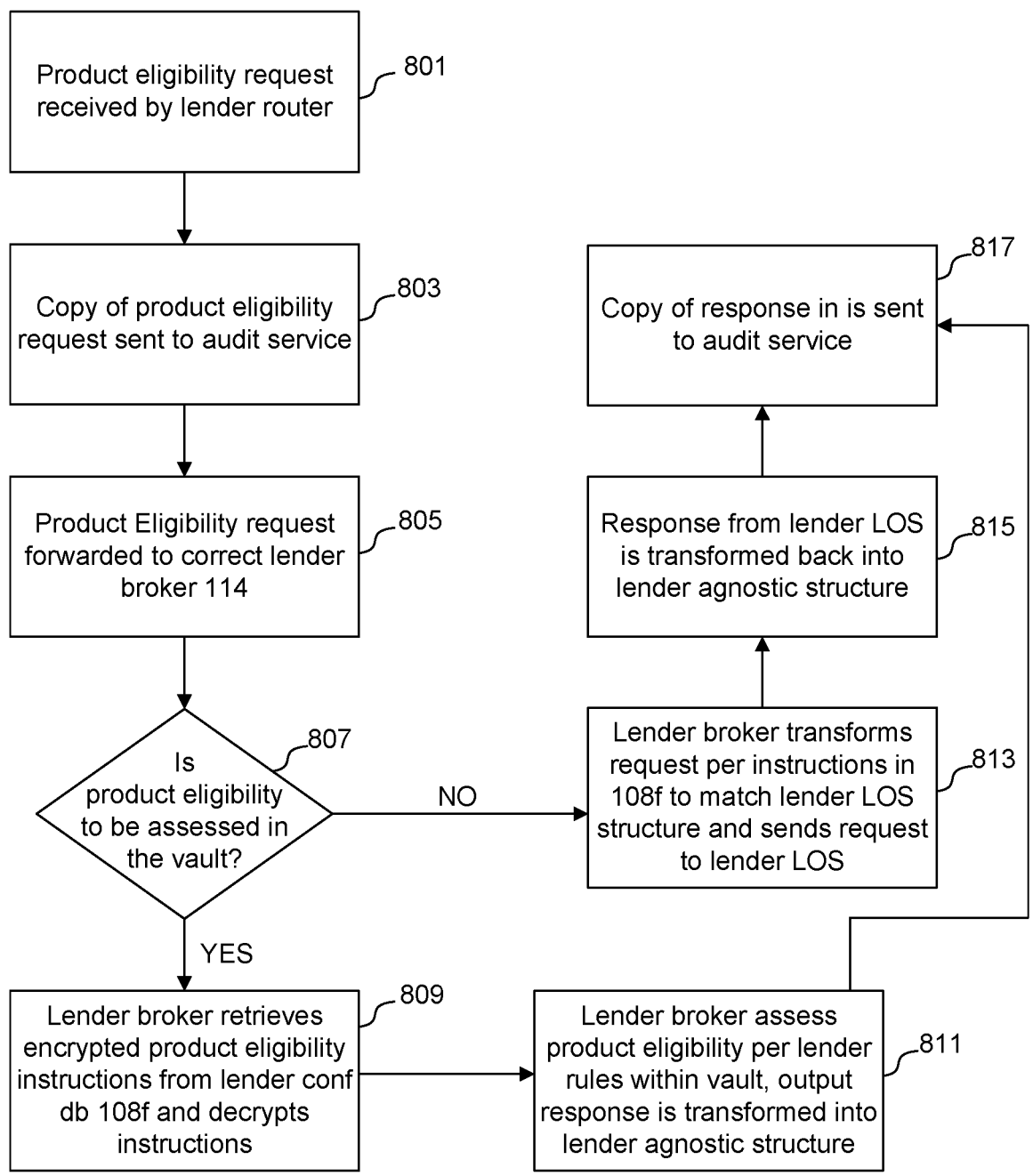
FIG. 8 is a flowchart showing the flow of how a product eligibility request is evaluated.

For a full description of auditing points, FIG. 5 shows example auditing points present with respect to the multi-lender layer and includes the auditing points from, e.g. the processes of FIGS. 7-9, the accessing of the vault 406 (corresponding to the vault 108 in FIG. 1) by a third party lender, the accessing of logs 501 by a third party lender 111, the accessing of the server upon which the vault is housed by administrator systems 401, or an administrator lender associate. Additional auditing points may furthermore be present at any further steps in the evaluation of user information by internal vault 108 processes (e.g. micro-services), as well as the accessing of data within the elastic compute system 404 housing the vault by external entities.

In an analogous manner, following the steps of the flowchart of FIG. 7 for multiple lenders and corresponding lender specific brokers 114, the Prequalification microservices 108*a* for a plurality of these lender specific brokers 114 may be processed, in parallel, to determine the outcome of the user's pre-qualification request for each of the multiple lenders using the user's personal information and the lender-specific rules and executable logic associated with each respective lender, as detailed above. In general, when executing the Prequalification service on user information, applicant eligibility may have three factors which are considered by lenders 120. First, inputted user personal and financial information is checked against specific lender requirements, which may differ for each lender. If basic requirements for the lender have not been provided, or are not met, the Application results in an Auto Decline status as an output response for that lender, as shown in step 305 of FIG. 3, and that respective lender is removed or greyed out for the vehicle being viewed in the Marketplace 201, displayed in the GUI 1006 of the Buyer UI 101 user interface.

If basic requirements for the lender are met, then the second factor assessed when executing the prequalification microservice (e.g. 108*a*) against provided user data is the applicant's credit score. Commonly accepted proprietary credit score models such as FICO, Equifax, Xperian, etc., may be used. In assessing the user's credit score, the Prequalification microservice (e.g. 108*a*) may interface with a third party service, querying external databases, such as, for example, that of Credit Bureaus, a lending terms database, a risk assessment database, or an employment confirmation database, wherein said interfacing may take place through an API call, external server FTP access, etc., to obtain information about the user's credit score, and may be reported in XML format from the external database query. Example providers of external databases may include International Development Association, RiskView, WorkNumber, etc.

In an embodiment, the system of the multi-lender architecture 100 may be able to use a lender-provided connection to access the third party service, so as to ensure that data is routed through normal parties, and not re-routed through the connection of an administrator of the multi-lender architecture. In this manner, the veracity of an unaltered credit report can be ensured with respect to a specific lender receiving that report, as opposed to the credit report being altered in any way due to a request made by an administrator of the multi-lender architecture instead of the lender from the lender's own systems. Because each lender interacts with third-party services such as credit bureaus with lender-specific variables including lending history, size, type of clientele, etc., the magnitude of the score that is reported back may be affected based on the lender interaction. Thus for assessing prequalification eligibility with respect to an applicant for a specific lender, it may be optimal to use a lender-provided connection to access the third party service. In addition, significant expense can be saved by the administrator of the multi-platform architecture by using existing agreements between particular lenders and third-party services for obtaining data, rather than forming new agreements.

The response from said third party service as part of step 713 or step 711 in the embodiments described above may be received in the form of eXtensible Markup Language (XML), wherein the response XML may then populate in the lender prequalification application in repository 203 as an attribute. As described above, the Prequalification may be different for each lender. For example, each lender may require different thresholds of credit scores, where some lenders may, for example, only be interested in customers with good credit above a threshold score. Third, based on the user's inputted address, the user's geographic presence is used to narrow lenders. For example, regional credit union bank lenders may only service specific zip-codes located within a limited geographic radius, or a specific state.

The Prequalification 108a micro-service may generate prequalification results, based on an electronic score calculated per lender rules produced in step 713 or step 711, which is then populated in the lender prequalification application in application repository 203, in response to processing the user's prequalification request for each of the multiple lenders. The prequalification results may include one or more multiple lenders which have pre-qualified the user for a product loan based on the personal information of the user, and the prequalification rules and/or executable logic associated with the respective lender may be returned as a single or multiple payloads in the universally encrypted format from the vault as described above. In an embodiment, the prequalification results may also include pricing information associated with the loan such as a range of possible internet rates and terms and conditions of the loans which is returned in pricing repository 202, wherein entries in the pricing repository 202 are temporarily stored in pricing cache 206, before being entered in the pricing repository 202, wherein each entry in the pricing repository 202 is associated with an application in application repository 203. Then, the pricing information from pricing repository 202, corresponding to the application in application repository 203, can be used to populate the fields of an offer in offer repository 204 also corresponding to the application, as described above. Each of the pricing repository 202, application repository 203, offer repository 204, dealer repository 205, and marketplace 201 comprise a data structure such as a database comprising primary and/or secondary memory within a cloud computing environment, such as computing resources 1022 within environment 1020, or other computing systems.

The Vault 108 may transmit the universally encrypted pre-qualification results from the lender specific broker 114 in the vault 108 (either directly or through lender router 116) to the API Passthru 107. The API Passthru 107 may in turn forward the encrypted prequalification results to the Buy/Sell API 106. The Buy/Sell API 106 may decrypt the encrypted prequalification results and interface from the universally encrypted format, as described above, into an individual segregated user session in one of the user-facing applications such as the Buyer UI 101 application, to render the decrypted prequalification results on the Buyer UI 101 application GUI 1106.

The processing of the Prequalification results is a dynamic process. Of the factors considered for Applicant Eligibility by the Prequalification 108a microservice, per the rules selected by the respective Lender, all rules may be considered together to narrow the list of prospective lenders that are deemed to be eligible for lending to the user, or each factor may be considered in turn. In either case, the list of eligible lenders that is displayed for a vehicle in the GUI of the Buyer UI 101 user interface is in turn dynamically and continuously updated according to the results of the Prequalification 108a processing. For example, the GUI may refresh with updated outcomes and information for prospective lenders, as well as an updated inventory of eligible products, every 45 seconds (or any other predetermined period of time, e.g. 0-100 seconds).

As an additional example, when the credit score of the user is considered by the Prequalification 108a microservice, the credit score may be processed with other applicant variables in assessing prequalification within the prequalification 108a micro-service, in a periodic continuous manner. This may in turn produce a dynamically and continuously updated electronic score calculated per lender rules at step 711 or 713 respectively, for a particular lender. This score may then be sent as a lender-agnostic universally encrypted output response to the Experience Layer 104, and populated in the application repository 203 as part of a specific lender application. Finally, the lender prequalification application for a particular vehicle, or for all vehicles in general, depending on specific lender rules, may be thereby approved or declined based on the generated electronic score calculated per lender rules in step 711 or step 713 respectively. This approval or declination may be output as a lender-agnostic universally encrypted output response from the lender specific broker 114 within the vault 108 to the Experience Layer 104 via the API Passthru 107, and may affect the displaying of the dynamically updated available lenders in the GUI 1006 for a user facing application such as the Buyer UI 101, as detailed above (e.g. greyed out if deemed ineligible, selectable and not greyed out if deemed eligible).

Within steps 711 or 713, such an electronic score calculated per lender rules may be calculated from the applicant variables based on scoring algorithms such linear regression, linear approximation, as well as machine-learning based algorithms such as Support Vector Machines (SVM), neural networks, or other weighted matrix-based manipulation, including any combination of said algorithms. In the above example, if the credit score of the user is deemed to be below an eligible credit score threshold for several lenders, then based on the electronic score dynamically populated per lender rules, these several lenders may be deemed as declined, and are dynamically eliminated from the list being displayed to the user in the Marketplace 201 being displayed in the GUI 1006 of the Buyer UI 101 user interface. This occurs through the two-way communication of Buyer UI 101, through the Buy/Sell API 106 and the API Passthru 107 gateway, and the communication of lender-agnostic output responses as shown in FIG. 6. Subsequent to the credit score evaluation, other applicant variables may also be dynamically evaluated in determining the electronic score calculated per lender rules, and can be accordingly updated in the GUI of the Buyer UI 101 user interface to further shortlist and display only lenders for a vehicle which the user may be eligible to borrow from, based on the user being approved or declined for those lenders.

The prequalification microservice 108a, as described above, runs different lender instructions for each specific lender, retrieved with a lender-specific key 601a, etc., and reports results back in lender-agnostic formats throughout the process of evaluating applicant eligibility. To report such information back in the GUI 1006 in a lender-agnostic format, as described, standardization occurs within the vault itself. For example, the individual microservices 108a-108c, which are one of the trusted and self-contained autonomous processes able to decrypt the individual lender rules and/or executable logic 108f associated with conducting prequalification on user data, are able to call the encryption service 115 which is able to re-encrypt the output response into a non-lender-specific universal format.

This standardization results in end-to-end secure transmission of data, wherein the Buy/Sell API 106 may take encrypted information from the Vault 108, sent through the API passthru 107, and decrypt it such that a yes/no decision is autonomously rendered, entered in the Application repository 203, and shown to the user via GUI 1106. Standardization also occurs after the applicant has been deemed eligible, and the desired product of the applicant has also been deemed as eligible, by microservices 108a and 108b respectively. In this case, as described above, after microservices 108a and 108b have deemed an applicant to be eligible for financing for a particular product, Pricing microservice 108c runs on the applicant information attributes (either within the vault or within a third party LOS 111a) and the product information attributes, and based on lender-specific information including lender-specific algorithms for processing these attributes, pricing information is determined in a lender-specific manner as shown in an analogous process in FIG. 9. The steps of the process of FIG. 9 correspond in an analogous manner to the steps of FIGS. 7 and FIG. 8. Pricing information is also reported back in a non-lender-specific universal encrypted format as shown in step 915. As described above, the pricing information can be reported back in the non-lender-specific universal encrypted format to the pricing repository 202, wherefrom it may be used to populate the fields of an offer in offer repository 204.

The information reported back from microservices 108a-108c must be reported back in such a manner that the Buy/Sell API 106 can decrypt it to show to the user as part of the offer 204 repository, within the Marketplace 201 on the GUI 1006. In order to do so, there may be instructions for each lender contained in the Lender Confidential data repository 108f to map to lender specific outputs and determine therefrom standard loan pricing information such as APR, loan term, loan conditions, monthly payment, prepayment penalties, balloon payments, and the like. These set categories of information are then encrypted, and sent in an encrypted manner from the vault, in an analogous manner as detailed above for prequalification microservice 108a, such that they are relayed by the API passthru 107 but cannot be read by the API passthru 107 as shown in FIG. 6. The API passthru 107 then relays the standardized encrypted information to the Buy/Sell API 106, where it may then be decrypted by the Buy/Sell API only within the pricing repository 202, application repository 203, or offer repository 104, segregated by user session and corresponding to a particular application of application repository 203, such that only an individual user of the UI can read the offer details, and these details are not accessible to anyone else using or administrating the system, including the system administrator of the multi-lender architecture.

The prequalification results from micro-service 108a, for example, are rendered on the GUI 1006 of the Buyer UI 101 application, based on the approval/declination of the user with respect to lenders assessed by corresponding lender specific brokers 114 in the vault. Based on these results of approved/declined, for the eligible lenders remaining for vehicles being displayed in the Marketplace 201, the user may select a vehicle intended for purchase on the GUI 1006 of the Buyer UI 101 application (via, e.g. a keyboard or mouse input on a GUI, etc.). Alternatively, as described above, the Buyer UI 101 application may receive a selection of a vehicle intended for purchase from the user at the same time as information is submitted for prequalification assessment to the Multi-Lender Layer 105, as described above.

In either case, whenever the selection of a product such as a vehicle intended for purchase from a user is received, the Buyer UI 101 application may encrypt the information associated with the selected vehicle (e.g., make, model, mileage, year, dealership, geographic location and/or the like) in the same universal encrypted non-lender-specific format, and transmit the information associated with the selected vehicle along with a product eligibility request to the multi-lender layer 105, via the Buy/Sell API 106 to the API Passthru 107. The API Passthru 107 may receive the information associated with the selected vehicle of the user from the Buy/Sell API 106, in the multi-lender layer 105. The API Passthru 107 may, without reading the encrypted information, forward the encrypted information associated with the selected vehicle to the lender router 116 within the Vault 108, along with a product eligibility request for a single lender or plurality of lenders (if the user has not yet been declined for the single lender or plurality of lenders). The lender router 116, in step 801 of FIG. 8, may in turn transmit the encrypted information associated with the selected vehicle and the product eligibility request to the corresponding lender specific broker 114. In order to route to the corresponding lender-specific broker 114 a lender parameter may be passed as part of the encrypted information, where in an embodiment this parameter only may be decrypted and read by the lender router 116. The same mode of routing by the lender router 116 may also apply with respect to the processes described in FIGS. 7 and 9. A process analogous to that of FIG. 7, for assessing product eligibility, per the attributes described above, follows.

The Product Eligibility 108b microservice, in step 811 or 813 of FIG. 8, corresponding to step 711 or 713 of FIG. 7 respectively, may retrieve product (e.g. vehicle) eligibility information (e.g. rules) associated with the lender of the lender specific broker 114 included in the prequalification results from microservice 108a, from the Lender Confidential data repository 108f. The Product Eligibility 108b microservices for a plurality of lender specific brokers 114 may determine, in parallel, whether the selected product, such as a vehicle, is eligible for an automobile loan from a given corresponding plurality of lenders that the user is eligible for lending from. This determination is made based on the information associated with the selected product and information associated with vehicle eligibility for each of the respective lenders. This information is, in the example of vehicles being the product purchase, in the form of agreements or other restrictions that certain dealerships may have with regard to certain lenders under a predefined criteria, and conversely in the form of agreements or other restrictions certain lenders may have with regard to certain dealerships under a predefined criteria, wherein the predefined criteria may include geographic proximity, type of vehicle (make/mileage/age of vehicle/condition of vehicle), type of lender, and the like.

As will be explained above with reference to FIG. 4, the restrictions of one party (dealer or lender) vis a vis other parties (dealers or lenders) are not viewable by any other party, including even the administrator of the multi-platform architecture, except for the one party itself. The information associated with vehicle eligibility may be different for each lender. For example, each lender may have different requirements for attributes, such as for a vehicle, make, model, year, mileage, price, and/or the like. In this regard, the product eligibility 108b microservice for a lender specific broker 114 may determine certain desired vehicles by a user of the Buyer UI 101 user interface are not eligible for loans from a given lender. As a result of having clearly defined rules which are customizable by parties (dealers or lenders), the operation of the Prequalification 108a and the Vehicle Eligibility 108b micro-services together serve to provide a mode of quick feedback compared to conventional solutions, and can significantly help a user in shortlisting prospective lenders for the purchase of a desired vehicle.

Furthermore, in an embodiment, none of the outputs of running lender rules are stored in the vault. In this embodiment, user personal and financial information may be relayed to the vault, wherein it may be operated on by the prequal 108a microservice, the product eligibility 108b microservice, and the pricing 108c microservice, as per lender rules. In this process, the user information itself may or may not be stored in the vault, in alternative embodiments. If stored, in an embodiment, it may only be stored in a temporary manner, such that when the microservices are done operating on the user information, it is deleted before the autonomous processes are finished, and the outputs of the microservices are sent out of the vault. When the prequal 108a microservice, the vehicle eligibility 108b microservice, and the pricing 108c microservice are finished operating on the user data, the outputs of these services may be relayed back to the GUI 1006 in the Experience Layer 104, via first the lender specific broker 114 (either directly or through lender router 116) to the API passthru 107, and then from the API passthru 107 to the Buy/Sell API 106, and onwards to the offer generation process as explained infra. These outputs may be relayed back such that they are only decrypted within the individual user session, which no lender, or even the administrator of the multi-lender architecture, may have access to. As a result, because such data may not be stored in the vault, and the outputs of such data are only visible to the user, the entire application is processed in an end-to-end secure manner.

The vault can function in this manner because of the way the API calling is structured relative to the microservices 108a, 108b, and 108c present in the vault. The API calling is driven by user action in the GUI 1006, wherein when the user chooses to explore the option of lending with a specific lender, then through the Buy/Sell API 106 a call is made to the API passthru 107, wherein an onwards call is made to the vault, wherein without a user or associate accessing the vault internally, the prequalification, product eligibility, and pricing microservices 108a, 108b, and 108c, respectively, may be run. As a result, due to the API calling protocol, the microservices inside of the vault are considered fully autonomous self-contained software, which may be executed for different third-party lenders, and which can potentially autonomously determine pricing information for an offer, and generate a loan. In this respect, with only indirect access present inside the vault, as shown in FIG. 4, the vault is considered a truly self-executing and jailed environment which enables autonomous assessment of applicant prequalification, product eligibility, and subsequently, pricing, for multiple specific lenders, in parallel, and rapid reporting of results to the user, through the Buy/Sell API 106, as discussed above.

In addition by having the API passthru 107 as a controlling gateway, it is possible to control versioning with respect to microservices prequalification 108a, product eligibility 108b, and pricing 108c. For example, due to different user requirements, lender requirements, etc., there may be a provision provided for the API passthru 107 to be compatible with different versions of these microservices. For example, if the lender confidential data repository 108f was updated with additional self-executing algorithms, or in the way its relationship with the other microservices was stored, the API passthru 107 could still be made to be compatible due to its modularization. That is, updated versions of the microservices are easily made compatible with the API passthru 107 through version control where development of updated versions of the above microservices adheres to framework which can input or output designated information based on API calls from the API passthru 107.

The Product Eligibility 108b micro-service may generate vehicle eligibility results. The product eligibility results may result in the user being approved or declined for one or more vehicles for a specific lender. Results from a plurality of product eligibility 108b micro-services for a corresponding plurality of lender specific brokers 114 may be processed in parallel to report the results of approval or declining for a selected product from a plurality of lenders. The results, based on approval, include one or more lenders from the lenders included in the pre-qualifications after the pre-eligibility screening criteria evaluation and/or the prequalification micro-service 108a, for which the Product Eligibility 108b micro-service determined the selected product is eligible for a loan.

Alternately, if a product is not selected in e.g. the GUI 1006 of the Buyer UI application 101, the results, based on approval from micro-service 108b, may include one or more lenders from the lenders included in the pre-qualifications after the pre eligibility screening criteria evaluation and/or the prequalification micro-service 108a have been conducted. In this case, these results are products for which the Product Eligibility 108b micro-service determined each of the remaining products in a dynamically updated and displayed list in 1006 is eligible for a loan based on the results of the pre-eligibility screening criteria and prequalification analysis results from microservice 108a.

The Vault 108 may encrypt the vehicle eligibility results and transmit the encrypted vehicle eligibility results from the lender specific broker 114 (either directly or through lender router 116) to the API Passthru 107. The API Passthru 107 may continuously forward the encrypted product eligibility results to the Buy/Sell API 106. This may occur as every criteria in assessing product Eligibility is processed by the product Eligibility microservice 108b of multiple lenders, meaning that the user viewing the GUI displaying the Marketplace 201 in the Buyer UI 101 user interface, would continuously see the list of lenders for a desired vehicle shortlisted, with the list being updated as different lenders assess vehicle eligibility results via the Vehicle Eligibility 108b micro-service of the corresponding lender specific broker 114. Alternately, all of these results could be processed in parallel, and reported back as a single payload to the Buy/Sell API 106, meaning that the GUI would rapidly be updated at once. The same parallel or sequential processing modes, as discussed above, may apply to the prequalification eligibility processing by micro-service 108a.

The Buy/Sell API 106 may decrypt the encrypted vehicle eligibility results and interface with the Buyer UI 101 application to render the decrypted vehicle eligibility results in an individually segregated user session within the Buyer UI 101 application, on a GUI 1006.

Subsequent to the vehicle eligibility results being rendered on the GUI 1006 of the Buyer UI 101 application, the application being worked on in the application repository 203, in the Marketplace 201 as displayed in the GUI of the Buyer UI 101 interface may be submitted to the Buy/Sell API 106. As described above, the application may be assessed according to lender-specific rules housed in the vault 108 in the lender confidential data repository 108f by the Pricing 108c micro-service. Subsequently the pricing 108c micro-service would then send the encrypted results in the form of loan pricing terms, which may be communicated through the API passthru 107 back to the Experience Layer 104, wherein the pricing and loan terms may be entered within a pricing repository 202 (entered from pricing cache 206 as described above), as well as where such pricing and loan terms may populate the fields of an offer in the offer repository 204 which may be displayed to the user in the GUI 1006 in the Buyer UI 101.

Alternatively, when the prequalification 108a and the product eligibility 108b steps are running for a specific lender, if the lender does not have a pre-decided Boolean/machine-learning logic to apply a specific rule set to the applicant information, the lender may choose a provided algorithm by the administrator of the multi-lender architecture. The lender may choose to have this algorithm run on the applicant information and the product information attributes, to generate pricing information. This may be useful in the instance, e.g., where a specific lender may not have a pre-developed algorithm, or an algorithm that they feel is too simplistic, for assessing loan pricing information, prequalification, or product eligibility attributes as disclosed above. Additionally, if the algorithm is too simplistic, the specific lender may also benefit by having an administrator provided algorithm run instead.

In an embodiment, such an administrator provided algorithm may be provided as an option on the Lender Portal 109 as well, such that it may be encrypted as lender-specific rules within the Lender Confidential data repository 108f, and may not be accessible by the administrator of the Multi-Lender Architecture. In this manner, if the lender portal 109 is a cloud-facing portal as described above, then the computing resources for running the administrator provided algorithm would be housed by the administrator as well. This may include a computer, server, cluster of computer or servers, NAS servers, or a configuration as shown in FIG. 7, including all components shown therein.

In this manner, an additional arrangement could be made between a lender and the administrator to run the algorithm using the administrator's resources, and the lender would not be burdened with incurring additional cost for overhead and infrastructure. Additionally, if the algorithm was provided within the lender portal 109 within the vault 108, which is not able to be accessed by even the administrator of the multi-lender architecture, several options for building algorithms may be offered to the lender, wherein the lender could per their choice choose a preset algorithm (e.g. a decision tree with specific lender-desired decisions, or a decision-cascade as described above, an SVM-type process, etc.), which would then run within the confines of the vault. In this manner, the lender, even if they did not initially have an algorithm, would be able to choose one within the secure confines of the vault in an encrypted manner not accessible to the administrator of the multi-lender architecture. Because each choice of algorithm may be segregated by lender session within the vault, this could be done in a secure manner wherein the choice of algorithm for a lender would not be revealed to anyone else, including the administrator of the multi-lender architecture, and the rule set for an individual lender would then be applied in an autonomous manner to user information within the vault, as desired, for the prequalification 108a, product eligibility 108b, and/or pricing 108c processes.

Finally, after the user is shown the offer in offer repository 204 in GUI 1006, as described above, and the user accepts the offer, the lender has two options to originate the loan from said offer. First, if there is an administrator lender associated with the multi-lender architecture, then any specific lender can opt to use an administrator lender provided API 112, and a loan origination system 112a within said administrator lender provided API 112, to generate the loan for the user. This could, e.g., be based on an agreement between the lender and the administrator lender, wherein if the applicant was found to be prequalified per, e.g. micro-services 108a and 108b, and agreed to terms by pricing micro-service 108c, wherein all of these microservices are based on lender specific rules housed in the Lender Confidential data repository 108f, then the lender would agree to have the administrator lender originate the loan using system 112a. Such origination may have an in-built autonomous communication from the administrator system 112a to lender computer systems (e.g. external systems 402 in FIG. 4), so that the lender can enter (or may have an autonomous script/code for entering) for their records that a loan has been originated by the administrator LOS system 112a.

Alternatively, a specific individual lender can use their own third party lender API 111, which may comprise the specific lender's own loan origination system 111a, from which they may generate a loan for the Applicant. As previously discussed with reference to FIGS. 7-9, this system 111a may also similarly be used to run micro-services 108a-108c wherein the lender-specific broker 114 within the vault may transform the parameters of prequalification, product eligibility, and pricing requests to conform to the parameters required by the third party API 111 of the specific individual lender. Such a system offers the flexibility for lenders to have options such as offer callbacks on their system, wherein manual evaluation and other steps may also take place, and the lender can respond at their leisure, seamlessly, through the API passthru 107 of the current system, wherein the lender response from the lender LOS 111a may be transformed back into the lender-agnostic universally encrypted structure of the Multi-Lender architecture in steps 715, 815, and 915 of FIGS. 7-9, respectively. In this manner, an offer callback may come through the third party lender API 111, through the lender specific broker 114 (either directly or through the lender router 116) to the API Passthru 107, and back to the experience layer 104, wherein the buy/sell API 106 may decrypt such a response, populate fields of a respective offer in the offer repository 204, and display the offer to the user via GUI 1006.

In the example where the product purchase is vehicles, the Buyer UI 101 application interface may also receive a request to build a loan offer for a selected vehicle, from a user. The request may include information associated with a desired loan, such as, price of a selected vehicle, down payment amount, loan amount, tax amount, dealer fees, service contract, GAP, and/or the like. The Buyer UI 101 application may encrypt the information associated with the request for building an offer and transmit the information associated with the request for building an offer to the multi-lender layer 105, via the Buy/Sell API 106. In an embodiment, the Buy/Sell API 106 may encrypt the information associated with the request for building an offer and transmit the encrypted information associated with the request for building an offer to the multi-lender layer 105.

An Offers micro-service integrated in the pricing micro-service 108c of lender specific brokers 114 within the Vault 108 may process and build a loan offer application based on the information associated with the request for building an offer, information associated with the selected vehicle, information associated with the user, and information associated with pricing. This may be done for several lender specific brokers 114 of a plurality of lenders in parallel, for each of the respective lenders, and then reported back as a universal non-lender-specific, encrypted, singular payload to the experience layer 104. The information associated with pricing may be different for each lender. For example, each lender may offer different interest rates based on the information associated with the request for building an offer, information associated with the selected vehicle, information associated with the user, even for the same vehicle and user. Additionally, each lender may use a different methodology for calculating pricing for a loan offer. For example, lenders may use Bayesian regression algorithms, decision trees, or various equations to determine pricing for a loan offer. Each of the different methodologies may be stored in the lender confidential information repository 108f.

In an embodiment, the offers portion of the pricing 108c microservice for lender specific brokers 114 within the Vault 108 may generate a reference number to correspond with a generated offer for the automobile loan. The generated offers and corresponding reference number for a plurality of lenders may be stored in one or more databases, such as the offers repository 204 in the experience layer 104. All of the offers generated during a single user session may correspond to a single reference number. Alternatively, each offer may correspond to an individual reference number. The offers may be saved in the offer repository 204 and retrieved by the user or lender at a later date using the reference number. A lender may only retrieve offers from the experience layer 104 provided by the lender itself using reference numbers. In this regard, a lender is not allowed to retrieve offers provided by other lenders. In an embodiment, each offer may be associated with an expiration date, and may not be valid after the expiration date. In such an embodiment, the offer may be deleted from the one or more databases after the expiration date.

The Offers portion of the pricing micro-service 108c may generate offers for automobile loans for a plurality of lender specific brokers 114. The offers may include loan amounts, interest rates, and terms and conditions of the automobile loan. The lender specific broker 114 may call the encryption service 115 to encrypt the offers in a universal non-lender-specific format, using one of the several protocols described above, and transmit an encrypted vehicle offer (either directly or through the lender router 116) to the API Passthru 107. As described above, a plurality of encrypted offers resulting from of a plurality of lender specific brokers 114, since they are in the same universal non-lender-specific format, may be grouped as a common payload and transmitted to the API Passthru 107. The API Passthru 107 may forward the encrypted offers, as a grouped payload or separate payloads, to the Experience Layer 104. In the Experience Layer 104, the Buy/Sell API 106 may decrypt the encrypted offers, and interface with the Buyer UI 101 application to render the offers on the Buyer UI 101 application GUI 1006. As explained above, the data of the outputs of the microservices 108a, 108b, and 108c, resulting in the offer terms, may only be decrypted by the Buy/Sell API 106, inside each individual user-session, leaving access to said data only with said user, wherein when such a user-session is terminated, the data left in the repositories of FIG. 2 (e.g. the application, offer, pricing terms, etc.) is associated with said user per e.g. the reference number scheme described above, and can only be accessed by said user.

In an embodiment, the data outputs constituting an offer may be deleted after a pre-determined time interval. Further, when the user accepts an offer, a reference number with the terms of the offer, but without microservices outputs, can also be sent to the lender, via a third party lender API 111, the lender portal 109, or in any other known manner. Alternatively, the reference number may be presented to the user in the form of a QR code, wherein offers may be stored securely on a blockchain ledger repository or other central database hosted by the multi-lender architecture as part of the offer repository 204, which may be accessed by the dealer, through e.g. the lender portal 109, to view the terms of the offer.

In an embodiment, the multi-lender architecture 100 may be associated with a financial institution (e.g., bank or lender, hereinafter called the Admin Lender). The Admin Lender may provide their own lending API platform Admin Lender AF 112. Lenders other than the Admin Lender would be referred to as Third Party Lenders. The lending platform 112 may include a Loan Origination System (LOS) 112a. Buyer UI 101 may communicate back and forth with the LOS 112a of the Admin Lender's lending platform 112 to generate a loan offer from the financial institution, via the Buy/Sell API 106 and the API Passthru 107 in the multi-lender layer 105. Buyer UI 101, in turn, may communicate back and forth with the LOS 112 of the lending platform 112 to generate a loan offer from the financial institution, in parallel, with the micro-processes (e.g., pre-qualification 108a, vehicle eligibility 108b, and pricing 108c) generating loan offers from various lenders in the vault 108. The loan offers from the financial institution may be presented alongside the loan offers from the other lenders on the GUI 1006 of the Buyer UI 101 application.

In an embodiment, the multi-lender architecture 100 may include a Third-Party API 111 including a Third Party Loan Origination System 111a. In the case a lender does not upload information associated with pre-qualification, product eligibility, and pricing into the Vault 108, the Third Party API 111 may instead be used to conduct any combination of these various steps, where applicant information along with a request for pre-qualification, product eligibility, and/or pricing to be performed may be routed from the lender-specific broker 114 in the vault 108 to the Third Party API 111. Such an API may be, e.g., a lender's client-reaching interface, such as a website. As explained above, results of the pre-qualification, product eligibility, and/or pricing services performed by the Third Party API 111 may be sent back to the lender-specific broker 114 of the vault 108, where they can be aggregated. Subsequently the Third Party LOS 111a may generate a loan offer for the lender. Like the LOS 112a, the Third Party LOS 111a may also communicate back and forth with the Buyer UI 101 application, via the lender specific broker 114, the Buy/Sell API 106, and the API Passthru 107 in the multi-lender layer 105, to generate a loan offer. The difference in this case is that the Buy/Sell API 106 and API Passthru 107 communicate with the third-party loan origination system 111a through the Third-Party API 111, instead of the Admin Lender AF platform 112. Buyer UI 101 may communicate back and forth with the third-party loan origination system 111a of the third-party API 111 to generate a loan offer from the financial institution, in parallel, with the micro-processes (e.g., pre-qualification 108a, vehicle eligibility 108b, and pricing 108c) generating loan offers from various lenders in the vault 108.

For lenders 120 that do upload information associated with pre-qualification, vehicle eligibility, and pricing into the Vault 108, through the Lender Portal 109, for the origination of a loan, these lenders are also given the option of whether they may want to use an administrator-provided lending platform API 112, or a third-party lending platform API 111. If they use the administrator-provided lending platform API 112, a lender can use an existing lease origination system 112*a* which is already integrated with the API Passthru 107, and can interact with the Multi-Lender Layer 105 in a bidirectional manner for presenting callback offers, etc. Alternatively, if the lender 120 uses a third-party lending platform API 111, a lender can use a Third Party Loan Origination System (LOS) 111*a*, which is also able to integrate with the API Passthru 107 through the lender specific broker in the vault 114, and interact with the Multi-Lender Layer 105 in a bidirectional manner. This example is shown in FIG. 1, where a bidirectional arrow is drawn from the lender LOS 111*a* to the lender specific broker 114. This structure can provide added functionality, e.g., of integrating the Multi-Lender Architecture with an existing lender origination backend service, and flexibility, in the case the lender does not already have an existing origination API. The lender specific broker 114 itself may be a function or class data structure incorporating the three micro-processes 108*a*-108*c* as subfunctions wherein each lender specific broker 114 is targeted for a specific lender (a specific lender may be one of its parameters, and how it is matched by the lender router 116, which also may be a function or class data structure). The lender specific broker 114 as well as the three-microprocesses 108*a*-108*c* may be present in primary and/or secondary memory of a cloud environment 1020 in FIG. 10 or a computer system, as well be described infra.

The structure of the Vault 108 will be explained in more detail. In particular, the self-contained software, in a blind manner, without the administrator of the multi-lender architecture being able to access the vault, evaluates the lender-specific requirements and eligibility rules from 108*e* and applies them to applicant-inputted information in the Pre-qualification step 108*b*, Vehicle Eligibility step 108*a*, and Pricing step 108*c*. After the assessment of the applicant's information is carried out under the provided lender-specific requirements and eligibility rules, the software produces encrypted output.

After the internal secure processes of the vault have run, the API Passthru 107 is able to access the outputs produced by the self-contained software (e.g. the eligible lenders an applicant may prequalify for, the type of vehicles which may be financed, and the pricing details such as APR) in an encrypted format, where the API Passthru 107 cannot read or interpret this encrypted data. The results are further passed back through the Multi-Lender Layer in this manner back to the Buy/Sell API in the Experience layer 104, which further passes the results back to the end-user interfaces of Buyer UI 101, Seller UI 102, or Digital Retail 103 respectively, where the encrypted data cannot be read or interpreted. Information may be communicated from the multi-lender layer 105 to the Buyer UI 101, Seller UI 102, or Digital Retailer 103 applications through the Buy/Sell API 106, to be rendered via the respective GUI. Finally, at the respective end-user interface, such as Buyer UI 101, Seller UI 102, or Digital Retailer 103, encrypted results are segregated by individual user session, wherein each such session is able to decrypt and display the contents of the encrypted outputs from the vault, to the user of said session, and thus inform a user of the lenders that they may be eligible to borrow under, the types of vehicles financed by said lenders that they may borrow for, as well as pricing-specific information such as the APR, loan term, and the like, of a prospective loan.

The exemplary techniques governing the structure of the vault 108 and its application can be applied more generally to receiving and storing in a jailed, self-contained environment, the rule sets or executable logic for one or more entities for providing entity specific responses to inquiries related to one or more products. For example, one or more rule sets or executable logic for each of at least one entity may be stored in a jailed and self-contained environment (e.g., vault 108), on a same server where the vault 108 may be stored. The one or more rule sets or executable logic may be encrypted with an entity-specific key. Such encryption may take place upon receipt of the one or more rule sets at the server. Alternately, the one or more rule sets or executable logic may be encrypted at a predetermined later time. After such encryption, the rule sets or executable logic for each such entity are accessible in the jailed and self-contained environment by at least one entity-specific routing component dedicated for each entity. Further, at the same server, a request from a particular user via a user-facing application may be received, relating to an inquiry associated with a product provided by each of the at least one entity. In response to such a received request, a response to the inquiry may be determined autonomously at the server for a respective entity based on the respective rule sets or executable logic for each respective entity. The rule sets or executable logic may be decrypted autonomously inside of the jailed and self-contained environment by the entity-specific routing component corresponding to a particular entity of the at least one entity. Then, the one or more rule sets or executable logic may be applied autonomously by the dedicated entity-specific routing component, to determine a respective response to the inquiry. The respective responses for each of the at least one entity that the inquiry is associated with may be found in an analogous manner. Accordingly, encrypted outputs containing the details of such a response may be generated autonomously in an entity-agnostic format by the dedicated entity-specific routing component for each of the at least one entity within the jailed and self-contained environment, based on the respective responses for each respective entity. Finally, the encrypted outputs can then be transmitted from such a server through an application protocol interface, to the user-facing application, wherein the outputs may be decrypted only in a particular user session, such that the contents of the decrypted outputs are visible only to a particular user.

The underlying structure of a computer system 1100, shown in FIG. 11, can implement a database and the sending and receiving of data, and thus any of the data repositories mentioned above may be implemented by the structure of such a computer system. Computer system 1100 may include one or more processors (also called central processing units, or CPUs), such as a processor 1104. Processor 1104 may be connected to a communication infrastructure or bus 1106.

Computer system 1100 May be virtualized, or it may also include user input/output devices 1103, such as monitors, keyboards, pointing devices, etc., which may communicate with communication infrastructure 1106 through user input/output interface(s) 1102.

One or more processors 1104 may be a graphics processing unit (GPU). In an embodiment, a GPU may be a processor that is a specialized electronic circuit designed to process table data received from the lender confidential data repository 108*f* to implement rules and/or executable logic for execution of the microservices 108*a*-108*c* in parallel for a plurality of lender specific brokers 114 as well as populating the fields of the repositories in the experience layer 104 in FIG. 2, based on the results of the output of the microservices in the vault 108. Finally, the GPU may also aid in encrypting the output from the micro-services in the universal non-lender-specific format, as well as for transforming the request for a micro-service to match a third party API 111 parameters, and finally for transforming an output response from a third party API 111 back to the normal microservice 108a-108c parameters, and encrypt said output in the universal non-lender-specific format. When data is to be processed in a mass quantity, thus, and/or processed using the machine learning logic (which is described above), the GPU may have a parallel structure that is efficient for parallel processing of large blocks of data, such as mathematically intensive data.

Computer system 1100 can also include a main or primary memory 1108, such as random access memory (RAM). Main memory 1108 can include one or more levels of cache (including secondary cache).

Computer system 1100 can also include one or more secondary storage devices or memory 1110. Secondary memory 1110 may include, for example, a hard disk drive 1112 and/or a removable storage device or drive 1114, which may interact with a Raid array 1116, which may combine multiple physical hard disk drive components (such as SSD or SATA-based disk drives) into one or more logical units, or a removable storage unit 1118. Removable storage unit 1118 may include a computer usable or readable storage device having stored thereon computer software (control logic) and/or data, including remotely accessed network drives. Removable storage unit 1118 may also be a program cartridge and cartridge interface, a removable memory chip (such as EPROM or PROM) and associated socket, a memory stick and USB port, a memory card and associate memory card slot, and/or any other removable storage unit and associated interface. Removable storage drive 1114 may read from and/or write to removable storage unit 1118.

Secondary memory 1110 may include other means, devices, components, instrumentalities or other approaches for allowing computer programs and/or other instructions and/or data to be accessed by computer system 1100. The components of the vault, such as the lender router 116, the lender specific broker 114, the lender analytic aggregator 108g, the audit service 117, the encryption service 115, and the Lender Confidential data service 108e may all be functions as described above that are self-executable or are in the form of modules which may be executed by a program, stored in primary and/or secondary memory of such a computer system. Such means, devices, components, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1100 may further include a communication or network interface 1124. Communication interface 1124 may enable computer system 1100 to communicate and interact with any combination of external devices, external networks, external entities, etc. (individually and collectively referenced by reference number 1128). For example, communication interface 1124 may allow computer system 1100 to communicate with external or remote entities 1128 over communications path 1126, which may be wired and/or wireless (or a combination thereof), and which may include any combination of LANs, WANs, the Internet, etc. Control logic and/or data may be transmitted to and from computer system 1100 via communication path 1126.

Computer system 1100 May also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Any applicable data structures, file formats, and schemas in computer system 1100 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination, and may be used for sending or receiving data (e.g. between any of the third party LOS systems 111a, the administrator lender LOS system 112a, the vault 108, the experience layer 104, admin systems 401, external systems 402, etc. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1100, main memory 1108, secondary memory 1110, and removable storage units 1118 and 1122, as well as tangible articles of manufacture embodying any combination of the foregoing. Such control logic, when executed by one or more data processing devices (such as computer system 1100), may cause such data processing devices to operate as described herein.

Computer system 1100 may be a client or server, accessing or hosting any applications and/or data through any delivery paradigm, including but not limited to remote or distributed cloud computing solutions such as cloud computing environment 1020 which will be explained infra; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

The cloud computing environment 1020 may include computing resources 1022. Each computing resource 1022 includes one or more personal computers, workstations, computers, server devices, or other types of computation and/or communication devices comprising primary and/or secondary memory, such as that of computing system 1100. The computing resource(s) 1022 May host the backend platform 1015. The cloud computing resources may include compute instances executing in the cloud computing resources 1022. The cloud computing resources 1022 may communicate with other cloud computing resources 1022 via wired connections, wireless connections, or a combination of wired or wireless connections.

Computing resources 1022 may include a group of cloud resources, such as one or more applications ("APPs") 1023-1, one or more virtual machines ("VMs") 1023-2, virtualized storage ("VS") 1023-3, and one or more hypervisors ("HYPs") 1023-4.

An application 1023-1 may include one or more software applications or programs that may be provided to or accessed by a computer system, such as web-based applications, web-based executables, web-based IDEs, etc. The application 1023-1 may include software associated with backend platform 1015 and/or any other software configured to be provided across the cloud computing environment 1020. The application 1023-1 may send/receive information from one or more other applications 1023-1, via one or more of the virtual machines 1023-2. Computing resources 1022 may be able to access each other's applications 1023-1 through virtual machines 1023-2, in this manner. The cloud computing environment 1020, hosted and executed by computing resources 1022, may communicate with the user facing applications via a network gateway 1030, using any of the various communication protocols and/or secure interfaces mentioned above.

Virtual machine 1023-2 may include a software implementation of a machine (e.g., a computer) that executes programs like a physical machine. Virtual machine 1023-2 may be either a system virtual machine or a process virtual machine. A system virtual machine may provide a complete system platform that supports execution of a complete operating system (OS). A process virtual machine may execute a single program and may support a single process. The virtual machine 1023-2 may execute on behalf of a user (e.g., the administrator of the multi-lender architecture) and/or on behalf of one or more other backend platforms 1015, and may manage infrastructure of cloud computing environment 1020, such as data management, synchronization, or long duration data transfers.

Virtualized storage 1023-3 may include one or more storage systems and/or one or more devices that use virtualization techniques within the storage systems or devices of computing resource 1022. With respect to a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the architecture flexibility in how they manage storage for data from processing of data, and aid in hosting processing micro-services for various lenders, etc. File virtualization may eliminate dependencies between data accessed at a file level and location where files are physically stored. This manner of block and file virtualization may enable optimization of storage use, server consolidation, and/or performance of non-disruptive file migrations.

Hypervisor 1023-4 may provide hardware virtualization techniques that allow multiple operations systems (e.g., "guest operating systems") to execute concurrently on a host computer, such as computing resource 1022, which may include a computing system such as a server or personal computer, and can in this manner host a virtualized hardware of a user computing system. Hypervisor 1023-4 may present a virtual operating platform to the guest operating systems, and may manage multiple instances of a variety of operating systems as these "guest operating systems," which may share virtualized hardware resource, such as RAM, which may for instance access the data in the form of a database of any of the repositories mentioned in the multi-lender layer 105 or the experience layer 104 above. Alternately, secondary memory may be accessed using virtualized storage 1023-4, or on physical storage, such as a hard disk drive of a computing resource 1022 of the type of computing system as a server, personal computer, etc. In embodiments heretofore described, using a combination of RAM and secondary memory to access the database, such that a portion of the database may be in-memory and a portion of the database stored in files, may also be used.

Combinations and permutations of the above described embodiments, in any order/sequence, are envisioned to be encompassed by the present disclosure. In addition, data may be encrypted or decrypted at or within any layer, at any point along the flow of the Multi-Lender Architecture, as shown in FIG. 2. Repositories may comprise of data repositories such as a database or cluster of databases, data warehouse, cloud storage, data lake, and the like.

What is claimed is:

1. A method comprising:
identifying a self-contained network, wherein a plurality of entities, including both a first entity and second entity, manage their own separate accounts on the self-contained network, wherein each of the plurality of entities stores confidential information on the self-contained network accessible only to a respective entity through their own entity-specific key;
receiving a first rule from the first entity and a second rule from the second entity;
storing the first rule being encrypted with a first entity-specific key for the first entity and the second rule being encrypted with a second entity-specific key for the second entity in the self-contained network that restricts an entity from accessing any entity-specific rules that are not associated with the entity;
receiving, from a user device, an inquiry associated with a user;
requesting, for an item, an entity response to the inquiry for each of the first entity and the second entity;
decrypting, in response to the inquiry and within the the self-contained network, the first rule for the first entity via the first entity-specific key and the second rule for the second entity via the second entity-specific key;
generating, as the entity responses, a first response based on the decrypted first rule for the first entity and a second response based on the decrypted second rule for the second entity;
generating, within the the self-contained network, a universally encrypted entity-agnostic composite payload comprising the first response and the second response;
sending the universally encrypted entity-agnostic composite payload to the user device;
retrieving host and infrastructure metrics regarding a performance of one or more devices of the self-contained network, wherein the host and infrastructure metrics exclude the confidential information; and
providing a dashboard regarding a health of the self-contained network based on the host and infrastructure metrics.

2. The method of claim 1, further comprising:
receiving, at a server, one or more rule sets or executable logic from each of at least one entity;
storing the one or more rule sets or executable logic in the self-contained network environment in the server, the one or more rule sets or executable logic being encrypted with an entity-specific key upon receipt of the one or more rule sets or executable logic for each such entity, or encrypted at a predetermined later time for each such entity, with the entity-specific key, wherein the one or more rule sets or executable logic for each such entity are accessible in the self-contained network environment by at least one entity-specific routing component dedicated for each such entity.

3. The method of claim 2, wherein each entity corresponds to a lender; each entity-specific routing component corresponds to a lender-specific broker dedicated for a particular lender; each entity-specific key corresponds to a lender-specific key dedicated for a particular lender; the item is a loan provided by a lender; the requesting is a request for lender prequalification relating to an inquiry associated with the item; the inquiry to which the request relates is for applicant financing of a commodity with at least one lender; the one or more rule sets or executable logic for each entity comprise one or more rule sets or executable logic for prequalifying an applicant, which are stored inside of the self-contained network in a lender confidential data repository; and wherein to determine a respective response to the inquiry, the lender-specific broker for each respective lender applies the one or more rule sets or executable logic to applicant information which is submitted along with the inquiry to assess applicant prequalification for each lender of the at least one lender of the inquiry and product eligibility for an applicant in lending from the at least one lender to purchase a particular product, and to further, if the applicant is found to prequalify for a lender and the particular product is eligible under a product eligibility process for the lender, assess pricing information to determine terms for a loan offer.

4. The method of claim 3, wherein each lender may access and manipulate or edit only their respective one or more rule sets or executable logic within the self-contained network, and not that of any other lender, for prequalifying an applicant through a lender portal application user interface, wherein once any editing by a lender of their respective one or more rule sets or executable logic takes place in the lender portal application user interface, a lender confidential data service is automatically called to make corresponding changes to rules or executable logic in the lender confidential data repository for that lender.

5. The method of claim 3, further comprising:
logging details of the one or more rule sets or executable logic that are executed in an audit repository stored inside of the self-contained network.

6. The method of claim 3, further comprising:
wherein the one or more rule sets or executable logic is applied to the applicant information to assess applicant prequalification or product eligibility for each lender of the at least one lender within the lender-specific broker corresponding to each said lender, within the self-contained network.

7. The method of claim 3, further comprising:
wherein the one or more rule sets or executable logic is applied to the lender prequalification request and applicant information within the lender-specific broker to, at least for one lender, modify the applicant information and lender prequalification request to match required lender parameters for an application protocol interface of a lender-based loan origination system which is in communication with the lender-specific broker; and sending the lender prequalification request and applicant information to the lender-based loan origination system for the at least one lender having said lender-based loan origination system.

8. The method of claim 7, further comprising:
assessing applicant prequalification for the at least one lender having said lender-based loan origination system; and
returning an output response to the lender-specific broker in the self-contained network.

9. The method of claim 8, further comprising:
transforming the returned output response by the lender-specific broker from the parameters matching the application protocol interface of the lender-based loan origination system to a non-lender specific universal format used in the self-contained network; and
encrypting said returned output response in a universal non-lender specific format to be decrypted in a particular user session.

10. The method of claim 2, wherein the one or more rule sets or executable logic may comprise at least one of boolean logic or machine-learning logic.

11. A system comprising:
a memory;
a server;
a processor coupled to said memory, the processor configured to:
identify a self-contained network, wherein a plurality of entities, including both a first entity and second entity, manage their own separate accounts on the self-contained network, wherein each of the plurality of entities stores confidential information on the self-contained network accessible only to a respective entity through their own entity-specific key;
receive a first rule from the first entity and a second rule from the second entity;
store the first rule being encrypted with a first entity-specific key for the first entity and the second rule being encrypted with a second entity-specific key for the second entity in the self-contained network that restricts an entity from accessing any entity-specific rules that are not associated with the entity;
receive, at the server, through an application user interface, from a user device, an inquiry associated with a user;
request, for an item, an entity response to the inquiry for each of the first entity and the second entity;
decrypt, in response to the inquiry and within the self-contained network, the first rule for the first entity via the first entity-specific key and the second rule for the second entity via the second entity-specific key;
generate, as the entity responses, a first response based on the decrypted first rule for the first entity and a second response based on the decrypted second rule for the second entity;
generate, within the self-contained network, a universally encrypted entity-agnostic composite payload comprising the first response and the second response;
send the universally encrypted entity-agnostic composite payload to the user device;
retrieve host and infrastructure metrics regarding a performance of one or more devices of the self-contained network, wherein the host and infrastructure metrics exclude the confidential information; and
provide a dashboard regarding a health of the self-contained network based on the host and infrastructure metrics.

12. The system of claim 11, wherein the system further comprises a graphic user interface (GUI), wherein the processor is configured to receive applicant information through said GUI, by the application user interface, wherein said application user interface comprises an application protocol interface (API).

13. The system of claim 11, wherein the system further comprises a graphic user interface (GUI), wherein encrypted outputs corresponding to the universally encrypted entity-agnostic composite payload are displayed on the GUI by an application protocol interface (API) through which the encrypted outputs are transmitted.

14. The system of claim 12, wherein encrypted outputs corresponding to the universally encrypted entity-agnostic composite payload are displayed on the GUI by the API through which the encrypted outputs are transmitted.

15. The system of claim 11, the processor further configured to:
    store one or more rule sets or executable logic for pre-qualifying an applicant inside of the self-contained network in a database of a lender confidential data respitory.

16. The system of claim 15, wherein the one or more rule sets may comprise at least one of boolean logic or machine-learning logic.

17. The system of claim 11, wherein the processor is further configured to:
    receive, at the server, through the application user interface, applicant information with respect to an application for applicant financing associated with the user for the item with at least one entity;
    apply one or more rule sets or executable logic to the applicant information to assess applicant prequalification or product eligibility for each entity within the self-contained network for generating the universally encrypted entity-agnostic composite payload.

18. The system of claim 11, wherein the processor is further configured to:
    receive, at the server, through the application user interface, applicant information with respect to an application for applicant financing associated with the user for the item with at least one entity, along with a prequalification request;
    apply one or more rule sets or executable logic to the inquiry and the applicant information within a lender-specific broker to modify the applicant information and prequalification request to match required lender parameters for an application protocol interface of a lender-based loan origination system which is in communication with the lender-specific broker; and send the inquiry and the applicant information to the lender-based loan origination system for at least one lender having said lender-based loan origination system.

19. The system of claim 18, wherein the processor is further configured to:
    receive a returned output response from the lender-based loan origination system;
    transform the returned output response via the lender-specific broker, from the parameters matching the application protocol interface of the lender-based loan origination system to a non-lender specific universal format used in the self-contained network of the server; and
    encrypt said returned output response to the universally encrypted entity-agnostic composite payload.

20. A non-transitory computer readable medium storing instructions that when executed by one or more processors of a device cause the one or more processors to:
    identify a self-contained network, wherein a plurality of entities, including both a first entity and second entity, manage their own separate accounts on the self-contained network, wherein each of the plurality of entities stores confidential information on the self-contained network accessible only to a respective entity through their own entity-specific key;
    receive a first rule from the first entity and a second rule from the second entity;
    store the first rule being encrypted with a first entity-specific key for the first entity and the second rule being encrypted with a second entity-specific key for the second entity in the self-contained network that restricts an entity from accessing any entity-specific rules that are not associated with the entity;
    receive, at a server, through an application user interface, from a user device, an inquiry associated with a user;
    request, for an item, an entity response to the inquiry for each of the first entity and the second entity;
    decrypt, in response to the inquiry and within the self-contained network, the first rule for the first entity via the first entity-specific key and the second rule for the second entity via the second entity-specific key;
    generate, as the entity responses, a first response based on the decrypted first rule for the first entity and a second response based on the decrypted second rule for the second entity;
    generate, within the self-contained network, a universally encrypted entity-agnostic composite payload comprising the first response and the second response;
    send the universally encrypted entity-agnostic composite payload to the user device;
    retrieve host and infrastructure metrics regarding a performance of one or more devices of the self-contained network, wherein the host and infrastructure metrics exclude the confidential information; and
    provide a dashboard regarding a health of the self-contained network based on the host and infrastructure metrics.

* * * * *